(12) United States Patent
Chowdhury et al.

(10) Patent No.: US 11,553,410 B2
(45) Date of Patent: Jan. 10, 2023

(54) METHOD AND APPARATUS FOR ACCESS POINT DISCOVERY IN DENSE WIFI NETWORKS

(71) Applicant: Northeastern University, Boston, MA (US)

(72) Inventors: Kaushik Chowdhury, Needham, MA (US); Kunal Sankhe, Boston, MA (US); Dheryta Jaisinghani, Cambridge, MA (US)

(73) Assignee: Northeastern University, Boston, MA (US)

( * ) Notice: Subject to any disclaimer, the term of this patent is extended or adjusted under 35 U.S.C. 154(b) by 65 days.

(21) Appl. No.: 17/319,141

(22) Filed: May 13, 2021

(65) Prior Publication Data

US 2021/0360515 A1 Nov. 18, 2021

Related U.S. Application Data

(60) Provisional application No. 63/023,968, filed on May 13, 2020.

(51) Int. Cl.
| | |
|---|---|
| H04W 48/16 | (2009.01) |
| H04W 84/12 | (2009.01) |
| H04L 5/00 | (2006.01) |
| H04L 25/02 | (2006.01) |

(52) U.S. Cl.
CPC ............ *H04W 48/16* (2013.01); *H04L 5/006* (2013.01); *H04L 5/0094* (2013.01); *H04L 25/0254* (2013.01); *H04W 84/12* (2013.01)

(58) Field of Classification Search
CPC ....... H04L 2025/03414; H04L 27/3863; H04L 27/2657; H04L 27/2655; H04L 27/0008; H04L 5/001; H04L 27/2626; H04L 27/2662; H04L 5/0007; H04L 27/00; H04L 27/2646; H04L 27/364; H04L 27/368;

(Continued)

(56) References Cited

U.S. PATENT DOCUMENTS

| | | | | |
|---|---|---|---|---|
| 5,553,064 A | * | 9/1996 | Paff | .......................... H04L 7/042 |
| | | | | 375/E7.002 |
| 2016/0242103 A1 | * | 8/2016 | Mindru | ................ H04J 11/0093 |
| 2017/0316233 A1 | * | 11/2017 | Kherani | ............. G06K 19/0723 |

FOREIGN PATENT DOCUMENTS

| | | | | |
|---|---|---|---|---|
| AU | 2016305961 B2 | * | 5/2020 | ............. G01S 13/26 |
| WO | WO-2022124920 A1 | * | 6/2022 | |

OTHER PUBLICATIONS

Sen et al., "CSpy: Finding the Best Quality Channel Without Probing", In Mobicom '13, Sep. 30-Oct, 4, 2013, Miami, FL, USA, pp. 1-12.

Sun et al., "Bringing Mobility-Awareness to WLANs Using PHY Layer Information", In CoNEXT '14, Dec. 2-5, 2014, Sydney, Australia, pp. 53-65. dx.doi.org/10.1145/2674005.2675017.

(Continued)

*Primary Examiner* — Daniel Lai
(74) *Attorney, Agent, or Firm* — Verrill Dana, LLP

(57) ABSTRACT

Systems, devices, and methods for access point discovery in a wireless network are provided. An access point device embeds into a preamble of a transmission packet discovery information including modifications determined by passing in-phase quadrature (IQ) symbols through a finite impulse response (FIR) filter to introduce a phase shift in selected ones of the IQ symbols. The phase shifts are encoded into bits in selected ones of a plurality of subcarriers, bounded by a maximum phase shift and a maximum number of the subcarriers to limit the packet error rate. A convolutional neural network can learn channel state and other information to determine the maximum phase shift and number of subcarriers. A client device can select from among a plurality of modified transmission packets to send a discovery request.

20 Claims, 16 Drawing Sheets

(58) Field of Classification Search
CPC . H04L 25/03343; H04L 25/14; H04L 5/0048; H04L 27/2675; H04L 27/36; H04L 1/0066; H04L 27/2627; H04L 27/2634; H04L 25/0212; H04L 27/148; H04L 1/0014; H04L 2027/0057; H04L 25/0264; H04L 25/03178; H04L 27/0014; H04L 27/2665; H04L 27/2698; H04L 27/362; H04L 1/0041; H04L 5/006; H04L 5/0094; H04L 25/0254; H04W 88/085; H04W 24/02; H04W 56/0005; H04W 52/0206; H04W 72/042; H04W 84/12; H04W 48/16

See application file for complete search history.

(56) References Cited

OTHER PUBLICATIONS

Soltani et al., "Spectrum Awareness at the Edge: Modulation Classification using Smartphones". 2019 IEEE International Symposium on Dynamic Spectrum Access Networks (DySPAN), Nov. 2019, pp. 1-10.

Selim et al., "Spectrum Monitoring for Radar Bands Using Deep Convolutional Neural Networks", In GLOBECOM.IEEE, 2017. arXiv:1705.00462v1 [cs.NI] May 1, 2017, pp. 1-7.

Sankhe et al., "ORACLE: Optimized Radio clAssification through Convolutional neuraL nEtworks", In INFOCOM, pp. 370-378. IEEE, 2019.

Zhang et al., "CSIsnoop: Attacker Inference of Channel State Information in Multi-User WLANs", In Proceedings of MlobiHoc '17, Chennai, India, Jul. 10-14, 2017, pp. 1-10. dx.doi.org/10.1145/3084041.3084048.

Rahbari et al., "Exploiting frame preamble waveforms to support new physical-layer functions in OFDM-based 802.11 systems", IEEE Transactions on Wireless Communications, 2017, pp. 3775-3786.

* cited by examiner

METHOD AND APPARATUS FOR ACCESS POINT DISCOVERY IN DENSE WIFI NETWORKS

CROSS REFERENCE TO RELATED APPLICATIONS

This application claims benefit under 35 U.S.C. § 119(e) of U.S. Provisional Application No. 63/023,968, filed on 13 May 2020, entitled "Method and Apparatus for Access Point Discovery in Dense Wi-Fi Networks," the disclosure of which is hereby incorporated by reference.

STATEMENT REGARDING FEDERALLY SPONSORED RESEARCH OR DEVELOPMENT

This invention was made with government support under Grant Number 1923789 awarded by the National Science Foundation. The government has certain rights in the invention.

BACKGROUND

With the pervasive availability of wireless devices and the dominance of multimedia applications, data traffic is poised to increase annually at a greater rate. The majority of the total IP traffic by 2022 may be over Wi-Fi, thus making it the dominant wireless technology. To support this traffic, the number of global public Wi-Fi hotspots will need to grow substantially, suggesting that network densification is inevitable. Standards such as IEEE 802.11ax and ay are also positioning Wi-Fi to be at the center of high bandwidth, low-latency communications in both sub-6 GHz and 60 GHz bands, respectively.

SUMMARY

Technology is described herein that addresses increasing network densification by providing embodiments of devices, systems, and methods for a spectrum-efficient and low-latency Wi-Fi access point (AP) discovery for Wi-Fi clients. The technology can overlay discovery information by inducing synthetic IQ variations into the legacy preambles of ongoing transmissions from APs without impacting the bit error rate (BER) beyond a pre-set threshold. A new Wi-Fi client can decode this transmission, without actively searching, for discovering the access point. The technology includes (i) an encoding scheme to map discovery information into the coefficients of a finite impulse response (FIR) filter used by the AP, (ii) a decoding scheme to extract discovery information at a Wi-Fi client using only channel state information at the physical layer, without any MAC layer processing, (iii) a convolutional neural network (CNN) to determine the optimal configuration under varying channel conditions, and (iv) supervised domain adaptation for realistic deployment to quickly train CNN even with limited availability of data. The technology can improve the spectrum efficiency of the network by reducing the overhead, in some cases up to 72% due to discovery traffic, while the long-tail (99th percentile) Wi-Fi latency at the client can be reduced by 95%.

To access the Internet over Wi-Fi, an end user needs to first connect to a nearby access point (AP). Before establishing a connection with a viable access point, the end user's device, such as a laptop, tablet, or smartphone, scans for all available access points. With the advent of large-scale Wi-Fi infrastructure deployments including the ones at the city scale, scanning for all access points takes up a lot of time and wastes spectrum in exchanging standard management packets. The situation worsens when the end-user wishes to be mobile, where the end user device continuously disconnects with the older access point, searches for new ones, and connects to the newer access point.

Other solutions involve configuring or fine-tuning scanning parameters, which do not work well in all network deployments, especially when end-users regularly change their Wi-Fi networks. The present technology avoids scanning in all channels and thus considerably reduces search time as well as the number of management packets that are exchanged. Access points keep announcing their availability hidden in ongoing data transmissions. In particular, the technology exploits the broadcast nature of Wi-Fi channels by embedding discovery related information within an access point's ongoing regular transmissions. The access point does this by intelligently distorting the transmitted signal while minimizing the effect of distortion on the ongoing communication. A new client can decode this transmission, without actively searching, to discover the access point.

1. A method for discovering an access point in a wireless network, comprising:
   at an access point device, embedding discovery information into a transmission packet, the discovery information comprising modifications introduced into a preamble of the transmission packet for decoding by a client device, wherein the modifications are determined by passing in-phase quadrature (IQ) symbols through a finite impulse response (FIR) filter to introduce a phase shift in selected ones of the IQ symbols, the phase shifts encoded into bits in selected ones of a plurality of subcarriers of an orthogonal frequency division multiplexing scheme; and at the client device, receiving the outgoing packet and decoding the discovery information.

2. The method of 1, wherein the FIR filter comprises a set of coefficients, each coefficient representative of a phase shift in a respective one of the subcarriers of the transmission packet.

3. The method of any of 1-2, further comprising selecting the coefficients of the FIR filter for the selected ones of the subcarriers containing encoded phase shifts to correspond to the selected phase shift angles, and setting the coefficients of the FIR filter for the subcarriers that do not contain encoded phase shifts to correspond to 0°.

4. The method of any of 1-3, further comprising introducing the modifications into a long training field portion of the preamble of the outgoing packet.

5. The method of any of 1-4, further comprising setting a maximum phase shift bound for the phase shifts, and setting a maximum number of the selected ones of the subcarriers at which the IQ symbols are modified.

6. The method of any of 1-5, further comprising dividing the plurality of subcarriers into a discovery rate field configured to convey a rate of discovery information and a discovery data field configured to convey discovery information; and
   dividing the discovery data field into a plurality of sequential groups of subcarriers, wherein for each group, a block of discovery information includes:
   bits representative of subcarrier locations within a selected group, and
   bits representative of the phase shifts encoded within the subcarrier locations within the selected group.

7. The method of any of 1-6, further comprising determining each block of discovery information from a subcarrier mapping table comprising a correspondence between a designation of input bits and determining a subcarrier index from a phase shift mapping table comprising a correspondence between an additional designation of input bits and a phase shift angle; and at the client device, demapping estimated phase shifts using a same phase shift mapping table and demapping indexes of the subcarriers to recover the discovery information bits using a same subcarrier mapping table.

8. The method of any of 1-7, further comprising dividing the plurality of subcarriers into a discovery rate field configured to convey a rate of discovery information and a discovery data field configured to convey discovery information.

9. The method of any of 1-8, further comprising dividing the discovery data field into a plurality of sequential groups of subcarriers, wherein for each group, a block of discovery information includes:

bits representative of subcarrier locations within a selected group, and bits representative of the phase shifts encoded within the subcarrier locations within the selected group.

10. The method of any of 1-9, further comprising determining each block of discovery information from a subcarrier mapping table comprising a correspondence between a designation of input bits and determining a subcarrier index from a phase shift mapping table comprising a correspondence between an additional designation of input bits and a phase shift angle.

11. The method of any of 1-10, further comprising at the client device, demapping estimated phase shifts using a same phase shift mapping table and demapping indexes of the subcarriers to recover the discovery information bits using a same subcarrier mapping table.

12. The method of any of 1-11, further comprising determining a number L of subcarriers in each group by an upper bound $N_{max}$ on a total number of subcarriers available to be modified with the discovery information.

13. The method of any of 1-12, further comprising acquiring channel state information and signal to noise ratio (SNR) information for a channel between the access point device and the client device from one or more previous transmissions, and inputting the channel state information, the SNR, and a desired data rate into a classifier trained to provide an optimal bound on a maximum phase shift and a maximum number of subcarriers.

14. The method of any of 1-13, further comprising determining the SNR from received signal strength indicator measurements.

15. The method of any of 1-14, further comprising training the classifier at the access point device with a convolutional neural network to learn the channel state information and determine an optimal maximum phase shift and an optimal maximum number of subcarriers at which the IQ symbols are modified for a given data rate and/or a given Modulation and Coding Scheme index value, wherein the classifier is trained initially using training data obtained in a simulated environment and subsequent retrained using transfer learning from the simulated environment to a real environment with training data obtained in a deployed environment.

16. The method of any of 1-15, further comprising training a classifier at the access point device with a convolutional neural network to learn the channel state information and determine an optimal maximum phase shift and an optimal maximum number of subcarriers at which the IQ symbols are modified for a given data rate and/or a given Modulation and Coding Scheme index value.

17. The method of any of 1-16, further comprising training the classifier initially using training data obtained in a simulated environment and subsequent retraining using transfer learning from the simulated environment to a real environment with training data obtained in a deployed environment.

18. The method of any of 1-17, further comprising training the classifier initially using training data obtained in a simulated environment and subsequent retraining using transfer learning from the simulated environment to a deployed environment with training data obtained in the deployed environment.

19. The method of any of 1-18, further comprising selecting a maximum phase shift $\theta_{max}$ and a maximum number of subcarriers Nm such that an increase in packet error rate is bounded by less than or equal to 1%.

20. The method of any of 1-19, further comprising at the client device, receiving the transmission packet from the access point device and decoding phase shifts and subcarrier indexes.

21. The method of any of 1-20, further comprising at the client device:

decoding the phase shifts and subcarrier indexes by detecting changes in estimated channel state information (CSI) by determining locations and heights of CSI phase patterns; and estimating phase shift information in sequential groups of subcarriers by comparison to threshold angles, wherein a presence of a phase shift indicates an index of a subcarrier within a group where an IQ symbol has been modified using the FIR filter by the access point device.

22. The method of any of 1-21, further comprising at the client device, decoding the phase shifts and subcarrier indexes by detecting changes in estimated channel state information (CSI) by determining locations and heights of CSI phase patterns.

23. The method of any of 1-22, further comprising at the client device, estimating the channel state information and estimating phase shift information in sequential groups of subcarriers by comparison to threshold angles, wherein a presence of a phase shift indicates an index of a subcarrier within a group where an IQ symbol has been modified using the FIR filter by the access point device.

24. The method of any of 1-23, further comprising at the client device, demapping the estimated phase shift using a phase shift mapping table and demapping the index of the subcarriers using a subcarrier mapping table to recover the discovery information bits.

25. The method of any of 1-24, further comprising at the client device, unwrapping raw phases of the transmission packet, and removing a slope of linear phases by subtracting a best-fitting straight line through a detrending operation.

26. The method of any of 1-25, further comprising at the client device, sending a discovery request targeted to the access point device that transmitted the transmission packet with the modifications.

27. The method of any of 1-26, further comprising at the client device, receiving a plurality of additional transmission packets from a plurality of additional access point devices, decoding phase shifts and subcarrier indexes from each of the additional transmission packets, and sending a discovery request to a selected one of the access point device and the additional access point devices.

28. A device for access point discovery in a wireless network, comprising:

a module including one or more processors and memory, the module operative to embed discovery information into a transmission packet, the discovery information comprising modifications introduced into a preamble of the transmission packet for decoding by a client device, wherein the modifications are determined by passing in-phase quadrature (IQ) symbols through a finite impulse response (FIR) filter to introduce a phase shift in selected ones of the IQ symbols, the phase shifts encoded into bits in selected ones of a plurality of subcarriers of an orthogonal frequency division multiplexing scheme; and a radio frequency (RF) front end and antenna operative to transmit the transmission packet for discovery by the client device.

29. The device of 28, wherein the FIR filter comprises a set of coefficients, each coefficient representative of a phase shift in a respective one of the subcarriers of the transmission packet.

30. The device of any of 28-29, wherein the coefficients of the FIR filter for the selected ones of the subcarriers containing encoded phase shifts are selected to correspond to the selected phase shift angles, and the coefficients of the FIR filter for the subcarriers that do not contain encoded phase shifts are set to correspond to 0°.

31. The device of any of 28-30, wherein the modifications are introduced into a long training field portion of the preamble of the outgoing packet.

32. The device of any of 28-31, wherein the phase shifts are bounded by a maximum phase shift, and a number of the selected ones of the subcarriers is bounded by a maximum number of subcarriers at which the IQ symbols are modified.

33. The device of any of 28-32, wherein the plurality of subcarriers is divided into a discovery rate field configured to convey a rate of discovery information and a discovery data field configured to convey discovery information.

34. The device of any of 28-33, wherein the discovery data field is subdivided into a plurality of sequential groups of subcarriers, and for each group, a block of discovery information includes:

bits representative of subcarrier locations within a selected group, and bits representative of the phase shifts encoded within the subcarrier locations within the selected group.

35. The device of any of 28-34, wherein each block of discovery information is determined from a subcarrier mapping table comprising a correspondence between a designation of input bits and a subcarrier index, and from a phase shift mapping table comprising a correspondence between an additional designation of input bits and a phase shift angle.

36. The device of any of 28-35, further comprising the client device operative to demap estimated phase shifts using a same phase shift mapping table and to demap indexes of the subcarriers to recover the discovery information bits using a same subcarrier mapping table.

37. The device of any of 28-36, wherein a number L of subcarriers in each group is determined by an upper bound $N_{max}$ on a total number of subcarriers available to be modified with the discovery information.

38. The device of any of 28-37, wherein the module is operative to acquire channel state information and signal to noise ratio (SNR) information for a channel between the access point device and the client device from one or more previous transmissions, and to input the channel state information, the SNR, and a desired data rate into a classifier trained to provide an optimal bound on a maximum phase shift and a maximum number of subcarriers.

39. The device of any of 28-38, wherein the SNR is determined from received signal strength indicator measurements.

40. The device of any of 28-39, wherein the module includes a trained convolutional neural network to learn the channel state information and determine an optimal maximum phase shift and an optimal maximum number of subcarriers at which the IQ symbols are modified for a given data rate and/or a given Modulation and Coding Scheme index value.

41. The device of any of 28-40, wherein the convolutional neural network is trained initially using training data obtained in a simulated environment and is retrained subsequently with limited training data obtained in a deployed environment aided with transferred knowledge from the simulated environment to the deployed environment using transfer learning.

42. The device of any of 28-41, wherein a maximum phase shift $\theta_{max}$ and a maximum number of subcarriers $N_{max}$ are selected such that an increase in packet error rate is bounded by less than or equal to 1%.

43. The device of any of 28-42, wherein the module is operative to:

acquire channel state information and signal to noise ratio (SNR) information for a channel between the access point device and the client device from one or more previous transmissions, and input the channel state information, the SNR, and a desired data rate into a classifier comprising a trained convolutional neural network to determine an optimal maximum phase shift and an optimal maximum number of subcarriers at which the IQ symbols are modified for a given data rate and/or a given Modulation and Coding Scheme index value, wherein the convolutional neural network is trained initially using training data obtained in a simulated environment and is retrained subsequently with limited training data obtained in a deployed environment aided with transferred knowledge from the simulated environment to the deployed environment using transfer learning.

44. A system for access point discovery in a wireless network comprising:

the access point device of any of 28-43; and a client device operative to receive the transmission packet from the access point device and decode phase shifts and subcarrier indexes.

45. The system of 44, wherein the client device is operative to decode the phase shifts and subcarrier indexes by detecting changes in estimated channel state information (CSI) by determining locations and heights of CSI phase patterns.

46. The system of any of 44-45, wherein the client device is operative to estimate the channel state information and determine channel state information phase per subcarrier index, and to estimate phase shift information in sequential groups of subcarriers by comparison to threshold angles, wherein a presence of a phase shift indicates an index of a subcarrier within a group where an IQ symbol has been modified using the FIR filter by the access point device.

47. The system of any of 44-46, wherein the client device is operative to demap the estimated phase shift using a phase shift mapping table and to demap the index of the subcarriers using a subcarrier mapping table to recover the discovery information bits.

48. The system of any of 44-47, wherein the client device is operative to:

decode the phase shifts and subcarrier indexes by detecting changes in estimated channel state information (CSI) by determining locations and heights of CSI phase patterns; and estimate phase shift information in sequential groups of subcarriers by comparison to threshold angles, wherein a presence of a phase shift indicates an index of a subcarrier within a group where an IQ symbol has been modified using the FIR filter by the access point device.

49. The system of any of 44-48, wherein the client device is operative to unwrap raw phases of the transmission packet, and remove a slope of linear phases by subtracting a best-fitting straight line through a detrending operation, 50. The system of any of 44-49, wherein the client device is operative to send a discovery request targeted to the access point device that transmitted the transmission packet with the modifications.

51. The system of any of 44-50, wherein the client device is operative to receive a plurality of additional transmission packets from a plurality of additional access point devices, decode phase shifts and subcarrier indexes from each of the additional transmission packets, and send a discovery request to a selected one of the access point device and the additional access point devices.

DETAILED DESCRIPTION

Figure 1:
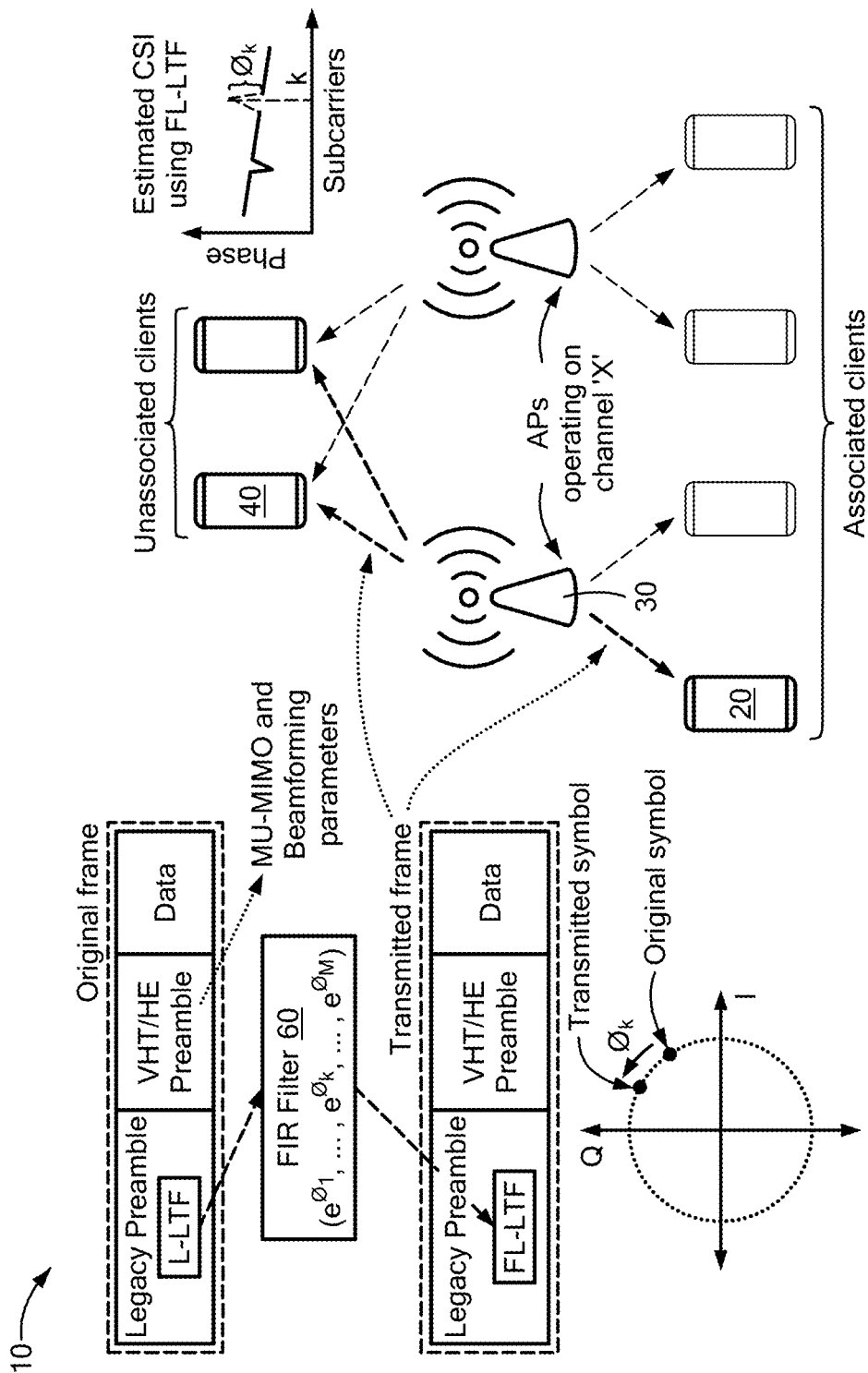
FIG. 1 is a schematic illustration of an embodiment of an access point (AP) discovery system that includes intelligent Wi-Fi access points and discovery operation at Wi-Fi clients. A Wi-Fi network with APs and clients operate on channel X. The AP embeds discovery information by controlled perturbation of the legacy preamble (L-LTF) through a finite impulse response (FIR) filter. Clients that wish to discover and associate with an AP analyze the channel state information (CSI) to extract discovery information.

Upcoming standards, such as the 802.11ax, can improve spectrum utilization through efficient time/frequency resource allocation via OFDMA, higher order modulation schemes in 1024-QAM, spatial reuse via MU-MIMO, and interference management via so called basic service set coloring. However, the discovery of access points (APs) has not evolved in over a decade. Relying on costly and legacy handshake of standard management packets, such as beacons and probes, for discovery of APs will not scale with network densification in the coming years. For example, in passive discovery, an AP typically broadcasts beacons in 100 ms intervals, which quickly adds up in hot spots with hundreds of APs. In active discovery, the AP must respond to every probe request sent by potential clients, creating a control traffic flooding situation.

Consider a building where access points (APs) are deployed to provide WiFi connectivity. When a WiFi device, such as a smartphone, tablet, or laptop, enters the building, prior to being able to communicate with the Internet, it needs to establish a connection with the AP. Legacy procedures involve a client to first scan the neighborhood, find a set of viable APs, choose the most appropriate AP, and then establish the connection. The process requires a handshake with several low data rate packets between the APs and the client, that wastes the spectrum resource. As progress is made towards achieving gigabits of network throughput, several hundreds of APs are deployed to suffice bandwidth needs of the end-users. With APs deployed at that scale, the legacy procedure of discovery takes a lot of time. The problem worsens when the client is mobile. For example, when a person carrying a smartphone roams in a building with a dense deployment of APs, the smartphone needs to frequently discover new APs and quickly establish the connection with a new AP without affecting the perceived connection quality for the end-user. In some embodiments, APs rely on instructions from a centralized network controller to combat the problem; however, such solutions need to be extremely time sensitive. With proliferation of dense network deployments, the technology described herein can provide an intelligent AP that takes proactive actions to prevent unnecessary discovery delays and improve spectrum utilization by avoiding useless transmissions.

To address this concern, a technology is provided as described herein that provides embodiments of systems, devices, and methods in which an intelligent Wi-Fi Access Point (AP) can encode information related to its own discovery by introducing subtle perturbations in its ongoing regular transmission. The target devices include Wi-Fi clients such as laptops, mobile smartphones, Internet-of-Things (IoT) enabled devices, appliances, and sensors that wish to find and associate to an AP. A software platform can provide various functionalities, such as, for example, embedding discovery information in an AP's outgoing transmissions, learning to select optimal parameters to encode discovery information, and extracting or decoding discovery information at Wi-Fi clients.

FIG. 1 illustrates an overview of a system 10 of the technology for intelligent APs 30 to enable efficient discovery for target devices 20, 40 deployed in dense Wi-Fi networks. The target devices shown here can be any devices that are operating at Wi-Fi, such as, without limitation, a mobile phone, a laptop, and an Internet of Things-enabled device, appliance, or sensor.

The technology provides embodiments of an access point (AP) discovery system and devices and related methods to improve spectrum utilization of Wi-Fi networks and reduce Wi-Fi latency at mobile clients. The technology can include an AP that employs a logic to embed information related to its own discovery within ongoing transmissions targeted for mobile clients. In effect, the client does not need to actively send handshake messages and the AP does not need to reply. Instead, the AP "hides" discovery information in the ongoing transmission, for which a client silently listens and can decode to discover the AP. This is achieved by embedding information related to discovery by introducing subtle perturbations within the legacy preamble at the physical layer for all outgoing Wi-Fi packets. These modifications to the preamble are achieved by introducing intentional phase shifts selected from a bound, at a maximum number of OFDM subcarriers where symbols are distorted. These perturbations can be configured so as not to hamper any ongoing transmissions at the same time. New clients do not need to wait for an AP discovery packet. Rather, new clients first estimate the channel state information (CSI) that captures the impact of the wireless channel on the transmitted signal and then leverage a logic to extract discovery information. New clients need to spend only a small fraction of time in a given Wi-Fi channel, just enough to capture a few symbols from a broadcast by the APs in that channel without any upper layer processing. When the client processes all channels, it chooses the best channel and connects with the AP in that channel.

To maximize the opportunity of embedding discovery bits by modifying the preamble, the discovery system can find an optimal combination of phase shifts and number of subcarriers used in OFDM modulation. However, in the practical time varying channels, finding the optimal bounds for these parameters is challenging. This is because satisfying the packet error rate (PER) constraint of the client requires consideration of not only the combinations of phase shifts and number of subcarriers, but also the data rate of the ongoing transmission as well as the channel quality measured in signal to noise ratio. The large number of possible permutations explodes the solution space and is beyond the computational capability of an AP to solve using traditional optimization problems.

To address this aspect, machine learning is leveraged to learn the channel and to output an optimal combination of phase shifts and number of subcarriers. This ensures the maximum number of bits are encoded without impacting the PER of transmissions. The machine learning model is trained with channel state information measurements of ongoing transmissions to select phase shifts and a number of subcarriers at the AP. This allows the AP to automatically adapt its information overlay rate to benefit the discovery process. In an experimental evaluation, this method reduced the overall delay at Wi-Fi connection from 150 ms to 10 ms and improved spectrum utilization by 72%.

Figure 2:
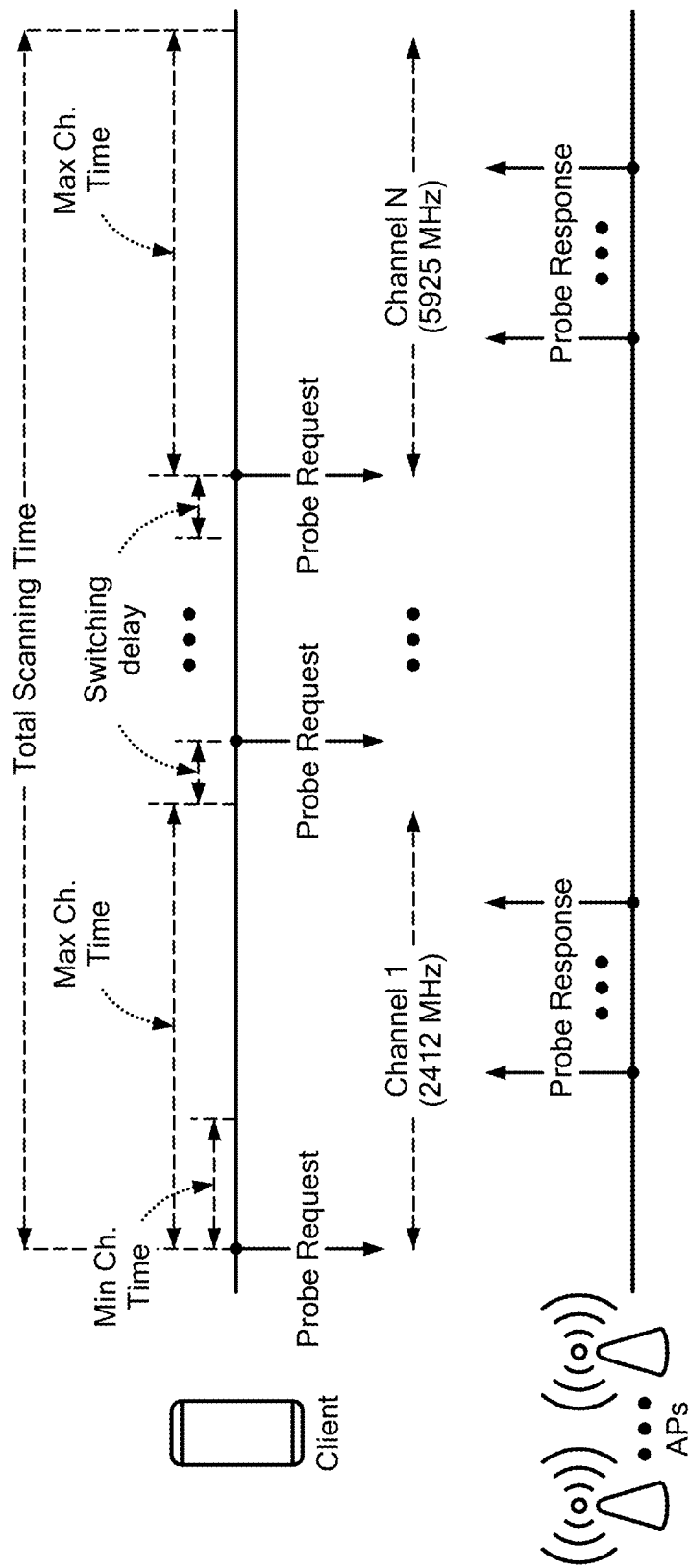
FIG. 2 is a schematic illustration of a default discovery process.

By way of further explanation, Wi-Fi clients rely on passive or active discovery processes to find nearby APs before associating with any viable AP. In passive discovery, an AP broadcasts beacons typically in 100 ms intervals. In active discovery, however, a client initiates the discovery procedure by sending a probe-request packet. Upon hearing the probe request, APs respond with probe response packets. Active discovery is mostly preferred over passive owing to its quick responses. FIG. 2 illustrates a demonstration of the default active discovery process. The client sends a probe request on a particular channel and waits for at least a minimum time (MinChannelTime (MinCT)) to detect any channel activity. If the client senses any activity during MinCT, it waits a maximum time (MaxChannelTime (MaxCT)) to potentially receive probe responses from operational APs. After MaxCT, the client switches to the next channel and sends a new probe request. MinCT and MaxCT are timing parameters set in the client device that directly impact its AP discovery time and number of discovered APs. Different strategies are known to find optimal settings of MinCT ranging from 1 ms to 7 ms and MaxCT of between 9 ms to 15 ms. However, this 'one for all' approach to select MinCT and MaxCT values does not work well in all network deployments, especially when Wi-Fi clients regularly change networks. By triggering active discovery frequently, a roaming client can rapidly establish a connection with a new AP, thus ensuring seamless connectivity. However, it imposes considerable overhead in a highly dense environment where thousands of clients constantly attempt to discover better APs, and even then this discovery process is uncertain to yield a positive outcome.

To further understand the scale of this problem, the impact of active discovery can be studied from two perspectives: (i) the spectrum wastage and (ii) the latency at the client. Network traffic traces were collected in a university building that has 35 Wi-Fi APs and 200 students at any given time. A laptop with Ubuntu 16.04 OS and Atheros AR9464 Wi-Fi chipset in monitor mode was used, and without loss of generality, traffic was captured on channel 6 (2.4 GHz) and channel 128 (5 GHz). Overall, an average of 3917 and 992 probe packets per minute, in 2.4 GHz and 5 GHz, respectively, were observed. The significance of these numbers was better understood by studying the collected traffic in sub-traces of 22 ms duration each.

Figure 3:
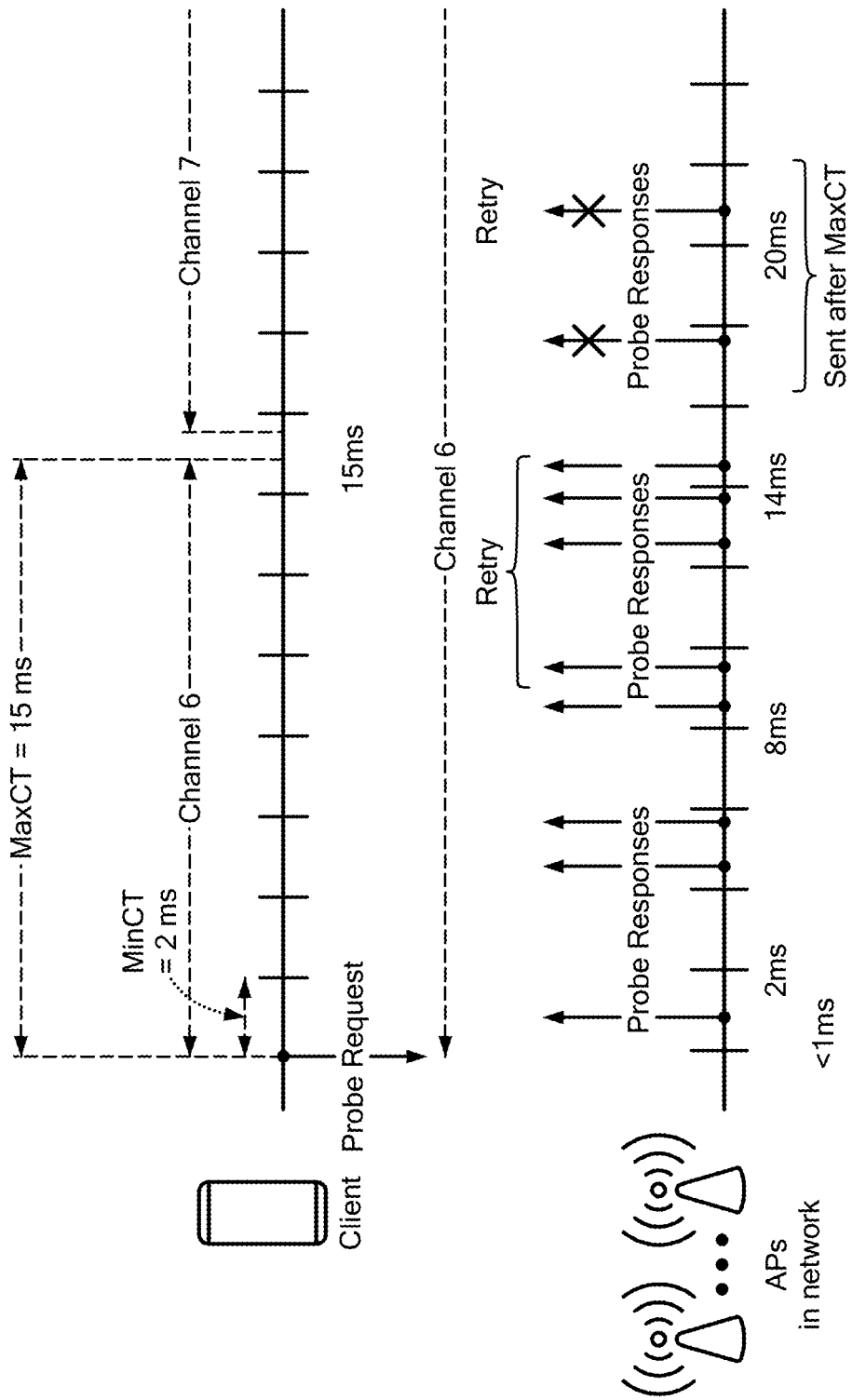
FIG. 3 is an illustration of adverse impacts of active discovery on a Wi-Fi network operating in the 2.4 GHz band. In 2.4 GHz, probe responses are received at the client after MaxCT, most of which are retried.

FIG. 3 depicts the spectrum wastage in the 2.4 GHz band. 62% of the probe responses reached a client after MaxCT. In a network with high congestion or dense AP deployment, the APs operating in 2.4 GHz may not find transmission opportunities before MaxCT, despite hearing a probe request from the client. Since after MaxCT, the client moves on to the next channel, probe responses sent by APs waste spectrum. Moreover, in a highly congested network, either the probe response or the corresponding acknowledgement may be lost. Without an acknowledgement, an AP retransmits the probe response, further congesting the network. During an active discovery a probe request from the client on one channel can be unintentionally decoded in adjacent channels. Upon hearing such requests, not only APs operating on the client's chosen channel but also others in adjacent channels reply with probe responses, thereby exaggerating the amount of probe traffic. These problems in 2.4 GHz reduce the overall spectrum utilization. Standards operating in 5 GHz bands may circumvent this issue partly by using fully non-overlapping channels. However, future standards like 802.11ax support 2.4 GHz as well. Therefore, the problem of spectrum wastage due to excessive probe traffic cannot be completely ignored.

Figure 4:
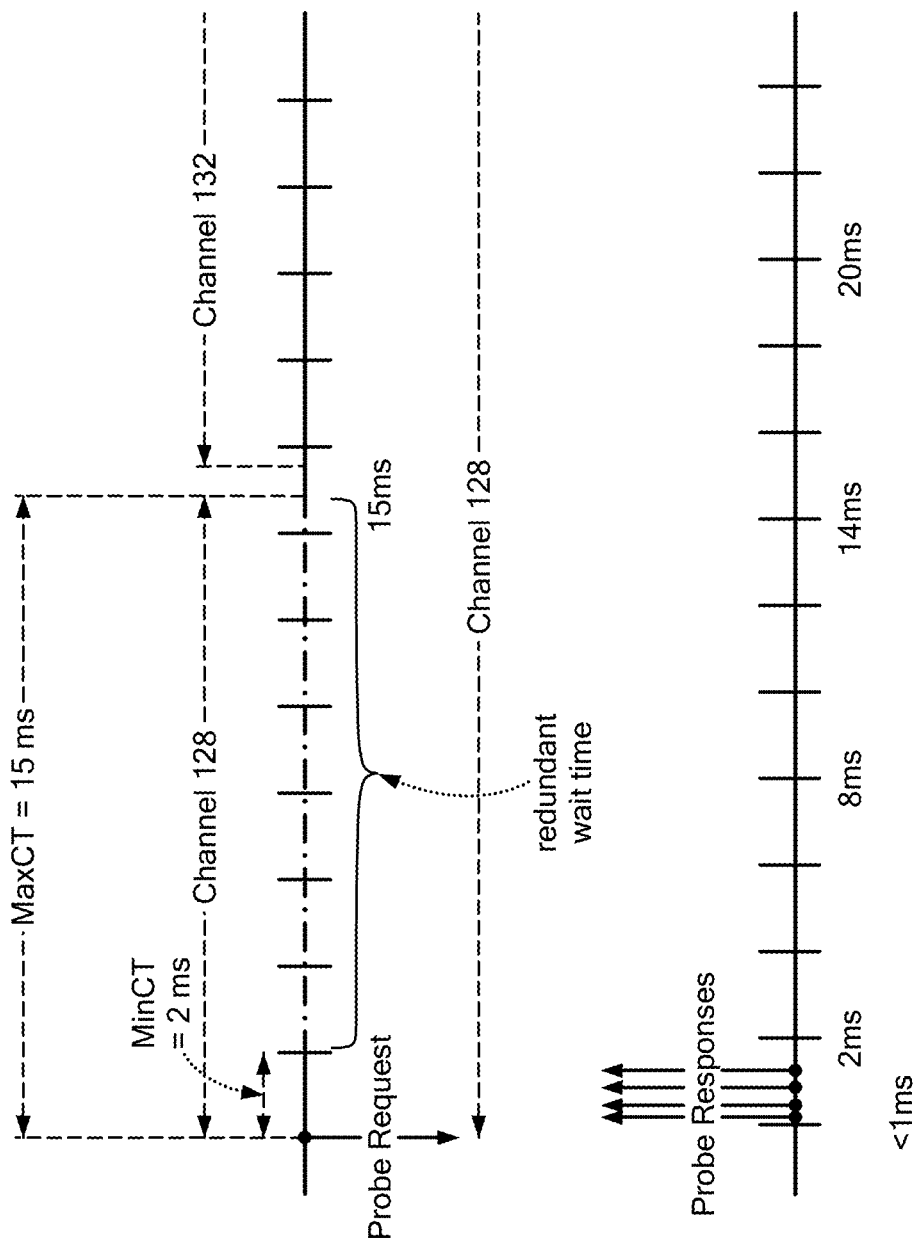
FIG. 4 is an illustration of adverse impacts of active discovery on a Wi-Fi network operating in the 5 GHz band. In 5 GHz, most probe responses arrive within MinCT at the client, resulting in unnecessary wait times.

FIG. 4 shows the wastage of airtime in the 5 GHz band due to active discovery. Contrary to APs operating in 2.4 GHz, APs operating in the 5 GHz band respond within MinCT after the client triggers the probe request. This is because higher rates (6 Mbps in 802.11ac) are used by clients to transmit these probe packets. However, here the client continues to listen on that channel for MaxCT despite receiving most of the probe response within MinCT. Thus, the client wastes a significant amount of airtime waiting for redundant probe responses.

Figure 5:
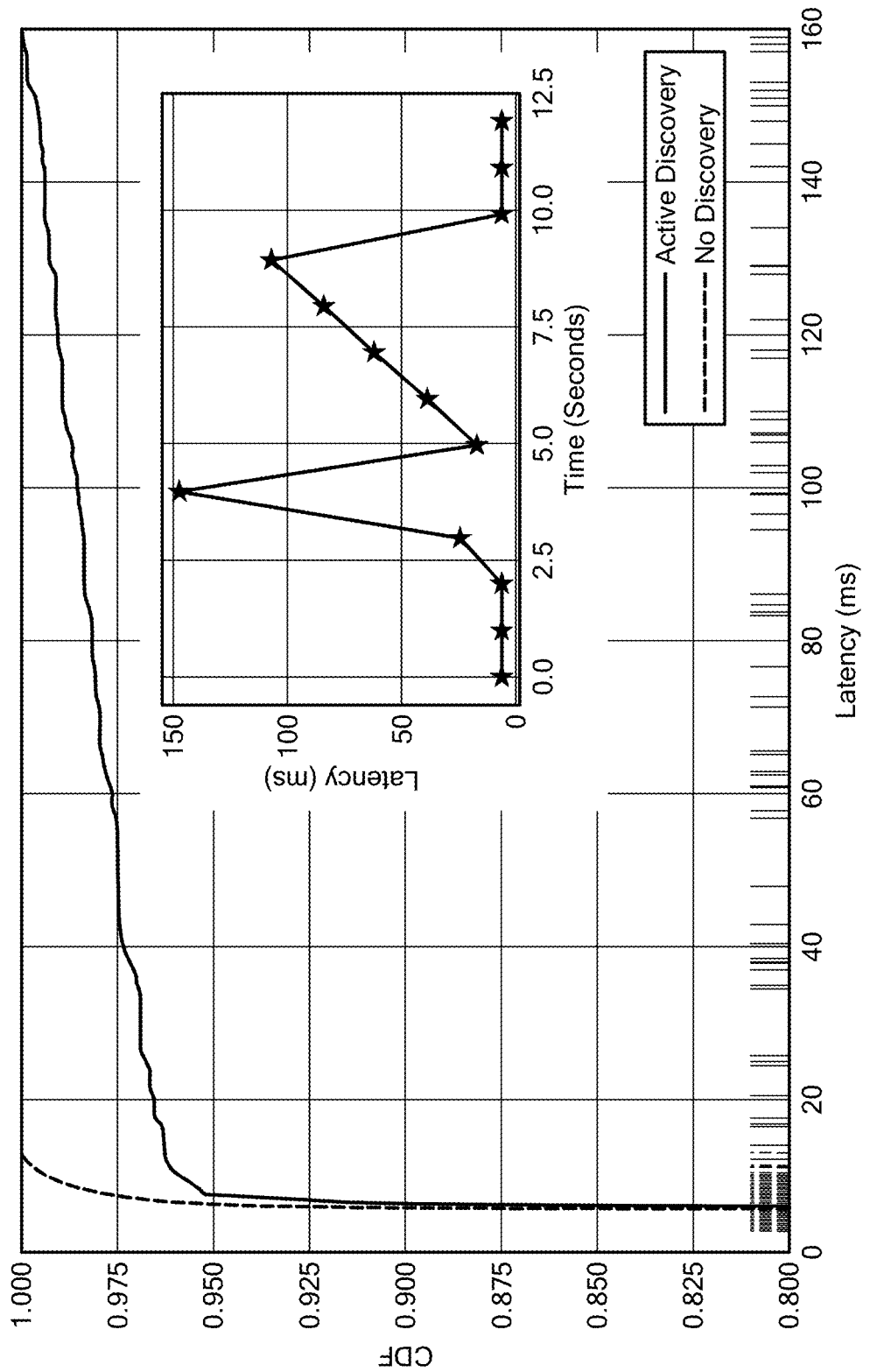
FIG. 5 is a graph illustrating Wi-Fi latency at the client to reach the AP. In the absence of active discovery, the latency remains within 15 ms; however, when the discovery is triggered, it increases to 160 ms.

FIG. 5 demonstrates the impact of active discovery on Wi-Fi latency through cumulative density function (CDF) plots of the client latency when active discovery is i) not triggered, and ii) triggered periodically. The ongoing data transmission between a client and the AP was studied. Emulating real-world behavior, the client was instrumented to trigger active discovery every 2 minutes. The impact of the interleaved discovery initiation on the latency observed at the client to reach the AP was studied. All background traffic as well as the default network managers were disabled to obtain an accurate measurement. The Ping utility was used to record latency. With no active discovery, the latency remained very low and varied between 3 to 13 ms, with median latency of ~5.5 ms. With periodic active discovery, the median latency was ~5.7 ms, its 97th percentile and 99th percentile were around 35 ms and 125 ms, respectively. The zoomed-in inset shows that the latency increased from 20 ms to 150 ms immediately after active discovery was triggered. Unfortunately, increased latency can be observed for the next few seconds as well. This was due to momentary deferring of discovery packets, because kernel tx and rx queues were filled-up with ping packets. The long tail of latency caused by active discovery can lead to multiple seconds of application-level delays resulting in longer page loads and can disrupt real-time or time critical services like VoIP, ultimately degrading the users' quality of experience.

As opposed to receiving a beacon every 100 ms, or sending a probe request every 15 seconds, a client in a densely populated Wi-Fi network receives any medium access control (MAC) layer packet every 250 μs. Irrespective of the packet type, a Wi-Fi client performs preamble detection and CSI estimation for decoding every transmitted packet. Then, it extracts MAC layer information from the PHY layer payload to decide if the packet is destined for the client. If not, then the client discards the packet. CSI estimation is performed to negate the channel distortions caused by multipath and fading.

The AP discovery technology herein can exploit the broadcast nature of Wi-Fi channels to enable efficient discovery operation for clients by employing intelligent APs in the network. Since every Wi-Fi client decodes the preamble of every packet transmission, the client no longer needs to wait for a beacon or probe if the AP embeds discovery information in these preambles. This approach makes discovery packets redundant. Instead, it leverages packets of any type that are transmitted in any event. The subtle perturbations to the preamble at the PHY layer introduced by the APs cause variations in CSI, which are estimated by the client and are used to extract discovery related information. The distortion of the regular packet preamble is also done in a way that does not adversely impact the packet-error-rate of the ongoing communication.

Figure 6:
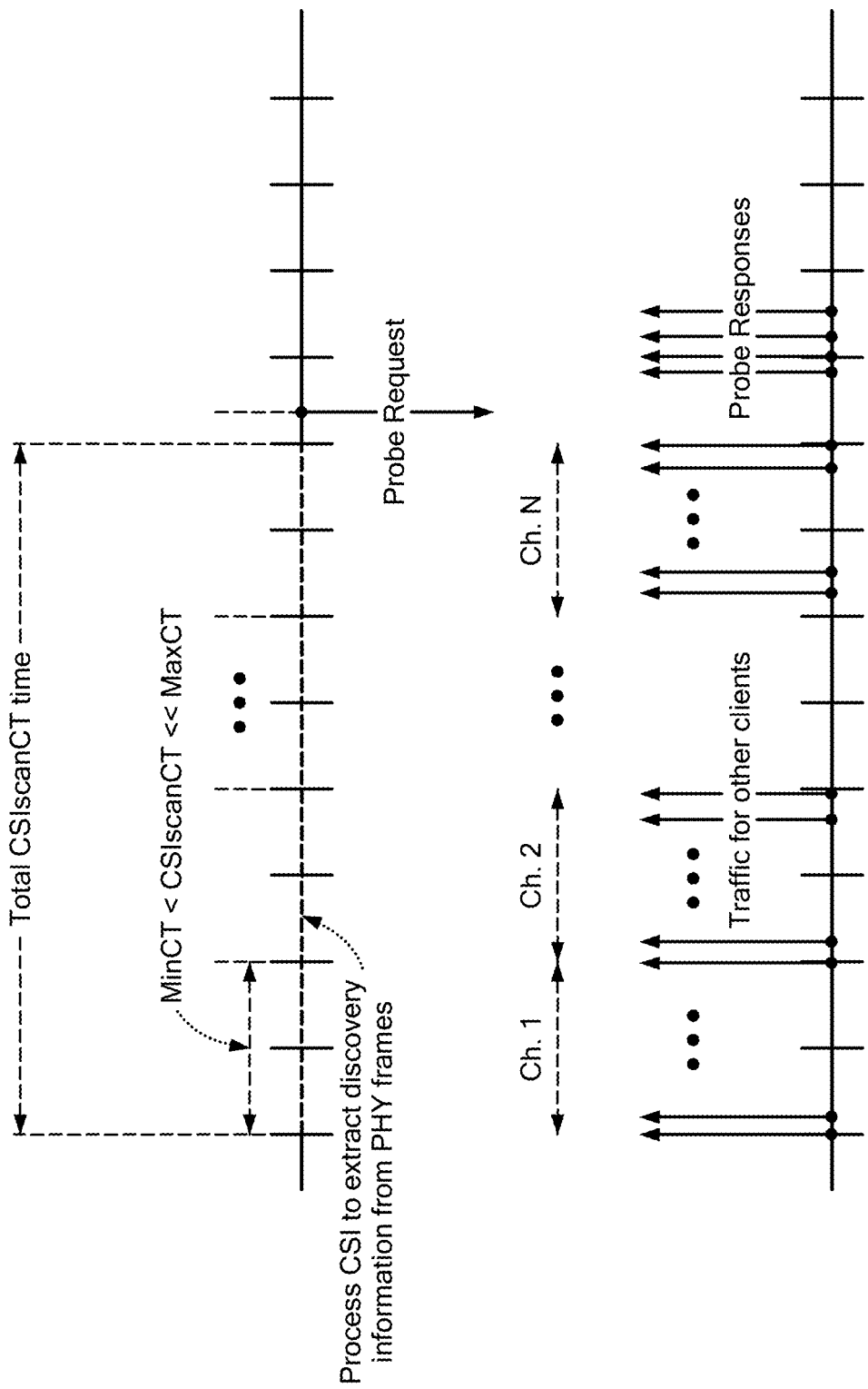
FIG. 6 illustrates an embodiment of a discovery system as described herein in which a client decodes channel state information (CSI) in the preambles of all frames, to choose one strong channel, and sends a single probe request on that channel only.

FIG. 6 depicts an AP discovery process, in which the client listens on each channel for a time (CSIscan channel time (CSIscanCT)) to obtain discovery-related information by passively processing CSI of incoming packets on that channel. An empirical value for CSIscanCT is derived from measuring the median of inter-packet arrival time of traffic of all APs. This value is updated periodically and set automatically for each AP separately. After processing the discovery information from all the channels, the client selects an appropriate channel to transmit a single probe request to discover a viable AP on that channel. This operation does not get affected even if the client receives packet transmission from other clients or APs that opt out of embedding information. APs in other channels intentionally suppress their responses as the client has made a selection of channel already. Thus, the system can reduce spectrum wastage due to excessive probe traffic by eliminating redundant probe traffic on other channels and enabling a client to spend considerably less time than MaxCT in any given channel.

The ability of channel equalization algorithms in Wi-Fi clients to handle limited synthetic distortions combined with natural channel distortions permits APs to induce subtle perturbations in an L-LTF signal. At a Wi-Fi client, the effect of these perturbations is visible in discernible, yet detectable changes in CSI. This allows the encoding of discovery information at an AP and decoding at the client. An encoding and decoding scheme employed by the technology is described further below.

An AP discovery process can include an encoding method to intentionally modify ongoing transmissions at an AP using FIR filtering. This encoding scheme modifies the legacy long training field (L-LTF) of the Wi-Fi packet in real time using discrete causal finite impulse response filters (FIRs) 60 (see FIG. 1). FIRs present several advantages: i) causal filters do not depend on future inputs, but only on past and present ones, and ii) they are represented as a weighted and finite term sum enabling accurate prediction of the output of the FIR for any given input. More formally, a FIR is described as a finite sequence of M filter coefficients, i.e., $\overline{\emptyset}=(\emptyset_1, \emptyset_2, \ldots, \emptyset_M)$. As L-LTF symbols are in the time domain, the filter $\overline{\emptyset}$ is converted into the time-domain using inverse FFT to create the filter's impulse response and then applied by convolution with L-LTF symbols. The FIR filter has complex coefficients that only distort the phase of L-LTF symbols and not their amplitude. This is because amplitude distortion changes the average power of the transmitted signal that adversely affects the ongoing communication.

The process is incorporated to map discovery information into FIR filter coefficients. The FIR filter intentionally modifies the L-LTF signal of the legacy preamble by introducing a phase shift in symbols transmitted through OFDM subcarriers. An FIR filter $\overline{\emptyset}$ is defined with 64 complex coefficients, i.e., $\overline{\emptyset}=[\emptyset_{-32}, \ldots, \emptyset_{-1}, \emptyset_0, \emptyset_1, \ldots, \emptyset_{31}]$, where $\emptyset_k = e^{j*2\pi*\theta_k*180}$ and $\theta_k$ is the phase shift (in degrees) introduced in $k^{th}$ subcarrier of observed CSI due to filtering. The indexing scheme $\{-32, \ldots, 31\}$ is chosen to match with that of 802.11 OFDM subcarrier mapping. The rationale behind 64 coefficients is that the legacy-compatible preamble in 802.11ax/ac always uses 64 subcarriers in 20 MHz of OFDM channel to support backward compatibility.

The L-LTF signal is constructed by transmitting symbols (308 symbols for 20 MHz channel) on 52 subcarriers out of 64 subcarriers. The remaining 12 are considered as null subcarriers. These null subcarriers are considered as 'do not care' and the constant value 1 is set for the corresponding 12 coefficients of the FIR filter, i.e., $\varnothing_k=1$ for k ∈ {−32, ..., −27, 0, 27, ..., 31}. This implies that information bits are mapped in the remaining 52 subcarriers with indexes {−26, ..., −1, 1, ..., 26}. The 52 subcarriers are divided into two fields, a discovery-rate field and a discovery-data field. The discovery-rate field spans the first 4 subcarriers with indexes {−26, −25, −24, −23} and is configured to convey a rate of discovery information. The discovery-data field spans the remaining subsequent 48 subcarriers with indexes {−22, ..., +26} and is used to convey discovery bits. The discovery-data field is further divided into 6 groups sequentially, with each group containing 8 subcarriers.

Let $N_{max}$ and $\theta_{max}$ be the upper bounds while designing the FIR filter to avoid hampering the ongoing communication. Out of the total number of subcarriers $N_{max}$, one subcarrier in the discovery-rate field is reserved. The remaining $N_{max}-1$ subcarriers are divided into 6 groups, i.e., L=int $(N_{max}-1)/6$ subcarriers in each group. Consider, $\theta = \{\theta_1, \theta_2, \ldots, \theta_M\}$ is the set of feasible phase shifts, such that $|\theta_i| \leq \theta_{max}$ for i ∈ 1, ..., M. A block of 'k' information bits is mapped into different phase shifts in various subcarrier locations within a group of 8 subcarriers using the mapping table of $N_{max}$ and $\theta$, where $$k = \left\lfloor \log_2 \binom{8}{L} \right\rfloor + L \times \left\lfloor \log_2 \binom{M}{1} \right\rfloor,$$

and M is the cardinality of the set $\theta$. Thus, $$R = 6*k = 6*\left\lfloor \log_2 \binom{8}{L} \right\rfloor + L \times \left\lfloor \log_2 \binom{M}{1} \right\rfloor$$

discovery bits are transmitted over each filtered packets.

Figure 7:
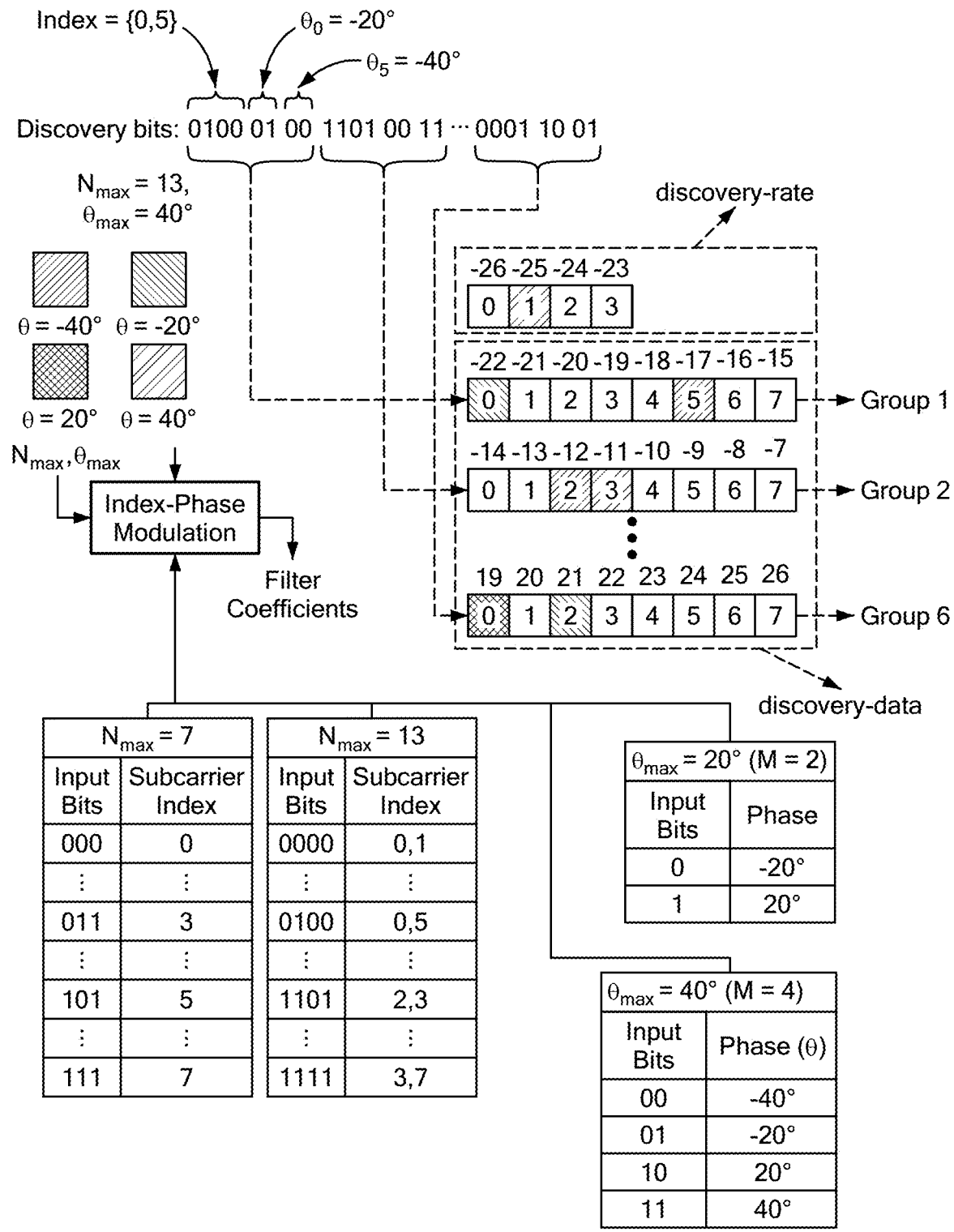
FIG. 7 is an illustration of an encoding operation of the AP discovery system.

FIG. 7 illustrates the encoding scheme by choosing $N_{max}=13$ and $\theta_{max}=40°$. Now, there are L=int (13−1)/6=2 subcarriers in each group. Let $\theta=\{-40°, -20°, 20°, 40°\}$ be the feasible set. Using the mapping tables for $N_{max}=13$, $\theta_{max}=40°$, the block of $$k = \left\lfloor \log_2 \binom{8}{L} \right\rfloor + 2 \times \left\lfloor \log_2 \binom{4}{1} \right\rfloor = 8$$

discovery information bits are mapped into subcarrier indexes and phase shifts. First, $$\left\lfloor \log_2 \binom{8}{L} \right\rfloor = 4$$

bits decide the indexes of L=2 subcarrier. For each selected subcarrier, choose the next $$\left\lfloor \log_2 \binom{4}{1} \right\rfloor = 2$$

bits to select the phase shifts to be introduced in L-LTF symbols. Information bits '0100' are mapped to subcarrier indexes '0' and '5' in the first group. The next two subsequent bits '01' are mapped to phase shift of −20° for symbol of $0^{th}$ subcarrier, whereas '10' bits are mapped to phase shift of −40° for symbol of 5th subcarrier. Correspondingly, FIR filter coefficients on those positions are selected as $\varnothing_{-22} = e^{j*2\pi*-20/180}$ and $\varnothing_{-17} = e^{j*2\pi*-40/180}$. Phase shifts of 0° can be selected for the remaining subcarriers in that group, thereby setting filter coefficients at those positions as 1.

Figure 8:
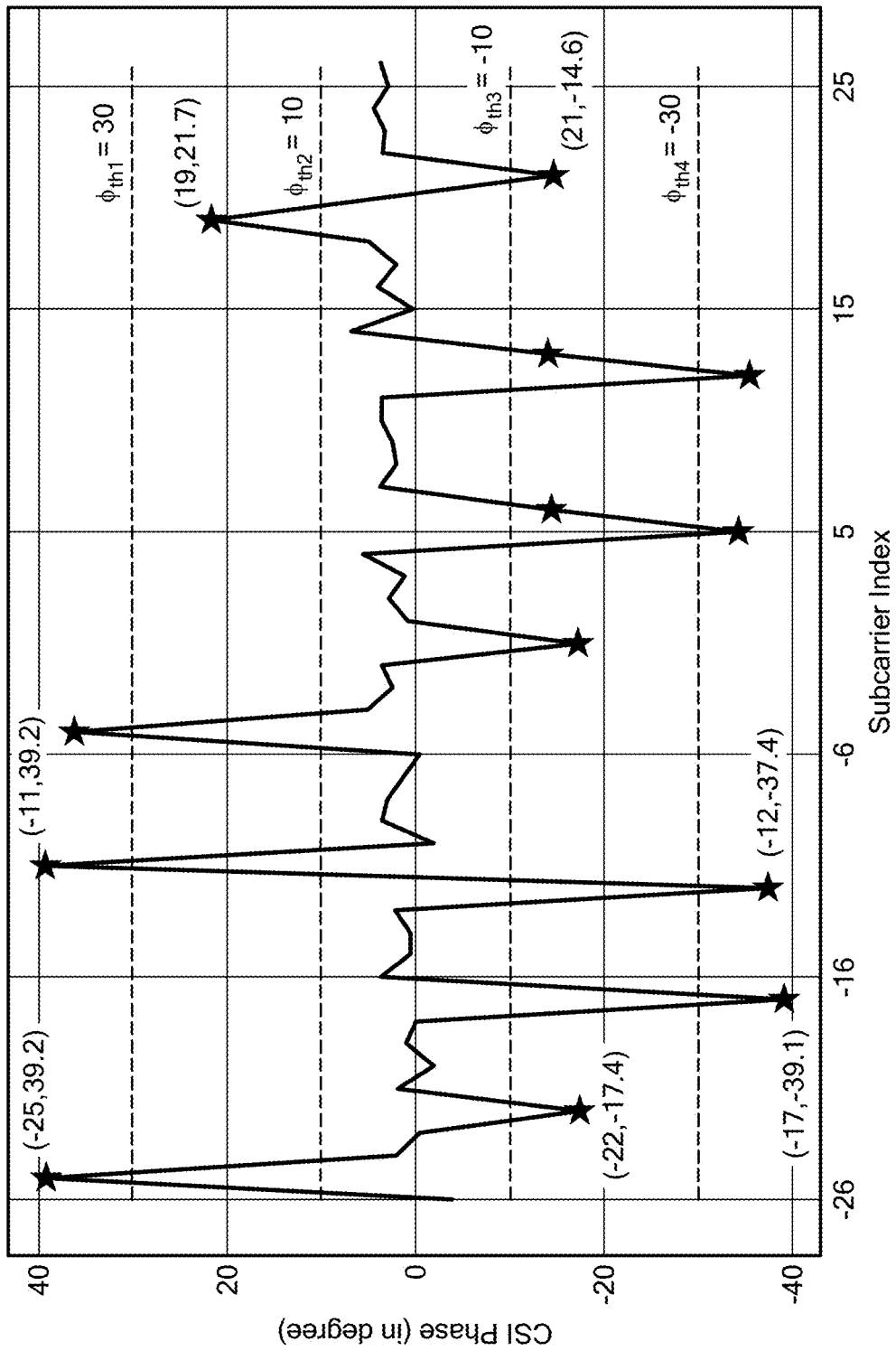
FIG. 8 is an illustration of a decoding operation of the AP discovery system. CSI phases are estimated using a filtered preamble signal.

FIG. 8 depicts a decoding process to recover discovery information using CSI phases. For decoding the packet, recall that a Wi-Fi client first estimates CSI using filtered L-LTF signal and extracts embedded information in the phases of the subcarriers by processing CSI phases. While raw CSI phases change periodically between [−π, π], unwrapped CSI phases for a stable wireless channel is always linear. The client performs statistical detrending operation on the CSI phases to subtract the slope without impacting phase shifts caused by FIR filtering. The detrending operation removes the best straight-fit line from the sequence of linear phases. FIG. 8 shows unwrapped CSI phases after detrending operation, where one can observe the jumps in CSI phases at certain subcarriers. To decode the information, the client uses the same groups of the subcarriers that is used while encoding. In each group of 8 subcarriers, the client estimates phase shifts at each subcarrier using thresholds. The presence of phase shifts indicates the indexes of the subcarriers within the group where the IQ symbol is intentionally distorted using the FIR filter. The client demaps the estimated phase shifts and the indexes of subcarriers to recover information bits using the same mapping table used during encoding. If any mismatch is found between the subcarrier indexes and their corresponding phase shifts with the entries in the mapping table, the discovery information is discarded. In FIG. 8, using threshold of ±10°, ±30°, the phase shift is segregated in each subcarriers into −40°, −20°, 0°, 20°, 40°. Phase shifts other than 0° are shown with starred markers in the figure. For example, the marker with label (−22, −17.5), indicates the phase shift of −17.5° introduced at the −22nd subcarrier index. This phase shift −17.5° is approximated to −20° using thresholds. Exactly −20° phase shifts at −22nd subcarrier can be observed in FIG. 7. Thus, Wi-Fi clients extract discovery information by processing CSI phase information.

The AP discovery process relies on the ability of Wi-Fi receiver to cope with natural channel distortions (e.g., multipath fading) combined with synthetic distortions (caused by FIR filtering) through conventional channel estimation algorithms. However, these algorithms are incapable of fully compensating channel distortions if exceeded beyond a certain limit. Therefore, the system finds an upper bound on synthetic distortions. Any excess of synthetic distortions can lead to an increase in packet error rate (PER) experienced by a receiver. PER is the ratio between the number of packets in error to the total number of transmitted packets. Even a single bit error is considered as packet error, so that the worst case performance is considered herein. Wi-Fi environment is simulated with 802.11ac-equipped devices. A transmitter generates QPSK modulated (MCS=2) PHY layer packets containing legacy preamble, VHT preamble and MAC layer data. Before transmission, the legacy preamble is modified in each packet by introducing constant phase shift $\theta$ in symbols transmitted on randomly selected N subcarriers of L-LTF signal. The modified packets are then transmitted over multipath wireless channel. An effective SNR of 30 dB at the receiver for each transmission is considered. The receiver decodes all received packets and compares the decoded bits in each packet with the transmitted bits to determine the number of packet errors. This experiment is iterated for 1 million channel realizations for different configurations of $N_{max}$ and $\theta_{max}$.

Figure 9:
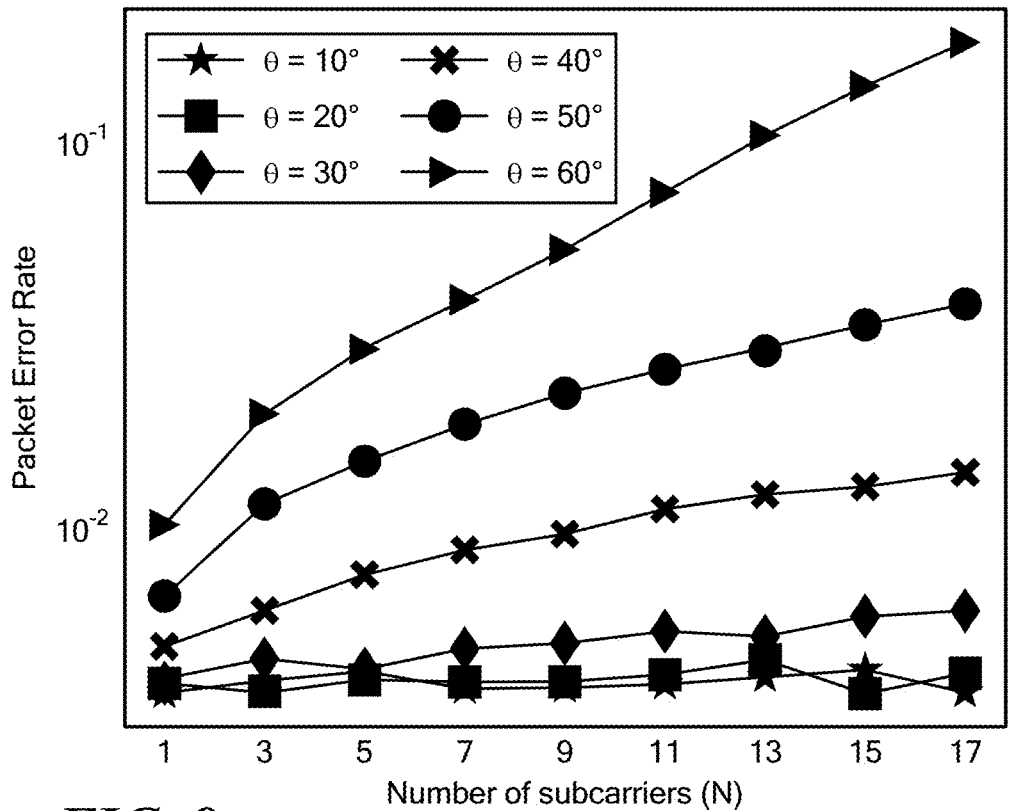
FIG. 9 is a graph illustrating average packet error rate (PER) observed with varying $\theta$.
Figure 10:
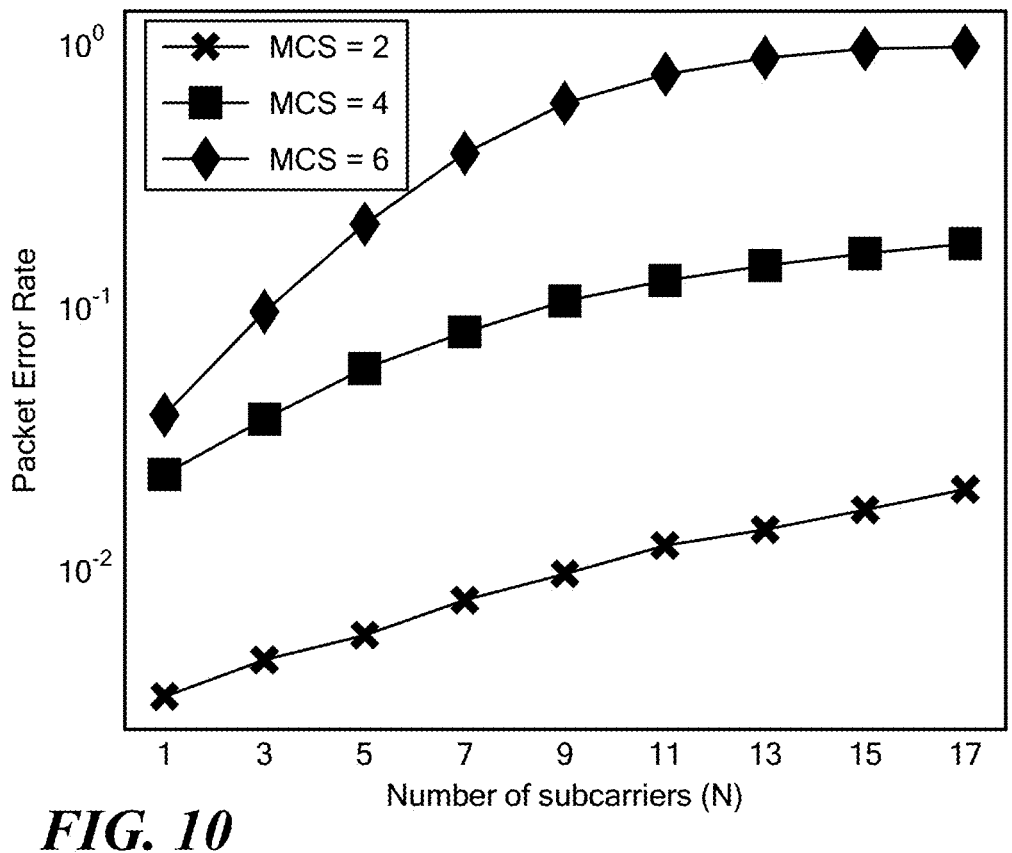
FIG. 10 is a graph illustrating average packet error rate (PER) observed with varying MCS.

FIG. 9 shows the average PER with respect to the number of subcarriers, $N_{max}$, for different phase shifts, $\theta_{max}$. For a fixed value of $\theta_{max}$, increment in the PER with respect to the number of subcarriers is observed. Further, the PER for a fixed value of $N_{max}$ also increases with the phase shifts. For a given PER constraint, this plot presents an upper bound on $N_{max}$ and $\theta_{max}$ to be used by the AP while encoding discovery information through the coefficients of FIR filter. The above experiment is repeated by varying the MCS index of the generated PHY packets and the number of subcarriers, while introducing the constant phase shift of $\theta_{max}=40°$. FIG. 10 shows the results. As expected, the PER increases as the MCS increases. However, the dependency of PER on MCS imposes to take MCS also into account while determining the upper bounds on $N_{max}$ and $\theta_{max}$. Further, the PER also varies with respect to the average SNR at the receiver and therefore must be considered while choosing $N_{max}$ and $\theta_{max}$. For a static wireless channel, the deterministic bounds on $N_{max}$ and $\theta_{max}$ can be found, so that the PER at a Wi-Fi client is always within permissible range. However, the bounds are difficult to estimate in time-varying channels. The pessimistic approach of embedding the least possible number of discovery bits by choosing the least supported values of $N_{max}$ and $\theta_{max}$ is undesirable. For instance, using bounds $N_{max}=1$ and $\theta_{max}=10°$, just 3 bits of discovery information can be conveyed in each filtered packet. However, it misses the opportunity of embedding >3 bits of discovery information in more than 99% packets (PER<1% for $N_{max}=1$ and $\theta_{max}=10°$ as shown in FIG. 9). On the other hand, overly optimistic approach of always transmitting the maximum number of discovery bits could severely hamper the ongoing communication of the client. For instance, the choice of bounds $N_{max}=17$ and $\theta_{max}=60$ will severely degrade the communication of the client with the PER>30% as show in FIG. 10.

In order to maximize the opportunity of embedding discovery bits with the preamble, an optimal combination of $N_{max}$, $\theta_{max}$ is found. However, in the practical time varying channels, finding the optimal bound is challenging. This is because satisfying the PER constraint of the client requires consideration not only of the combinations of $N_{max}$ and $\theta_{max}$, but also the data rate MCS of the ongoing transmission as well as the channel quality measured in SNR. The large number of possible permutations explodes the solution space and is beyond the computational capability of AP to solve using traditional optimization problem.

The technology can thus learn the CSI estimated from a previous transmission of a client to decide the optimal bounds of $N_{max}$ and $\theta_{max}$ to be used for embedding discovery information on the next ongoing transmission targeted for that client. With this approach, maximum discovery information is transmitted for clients who wish to discover the AP, while ensuring no discernible increase in PER of ongoing transmission.

Figure 11:
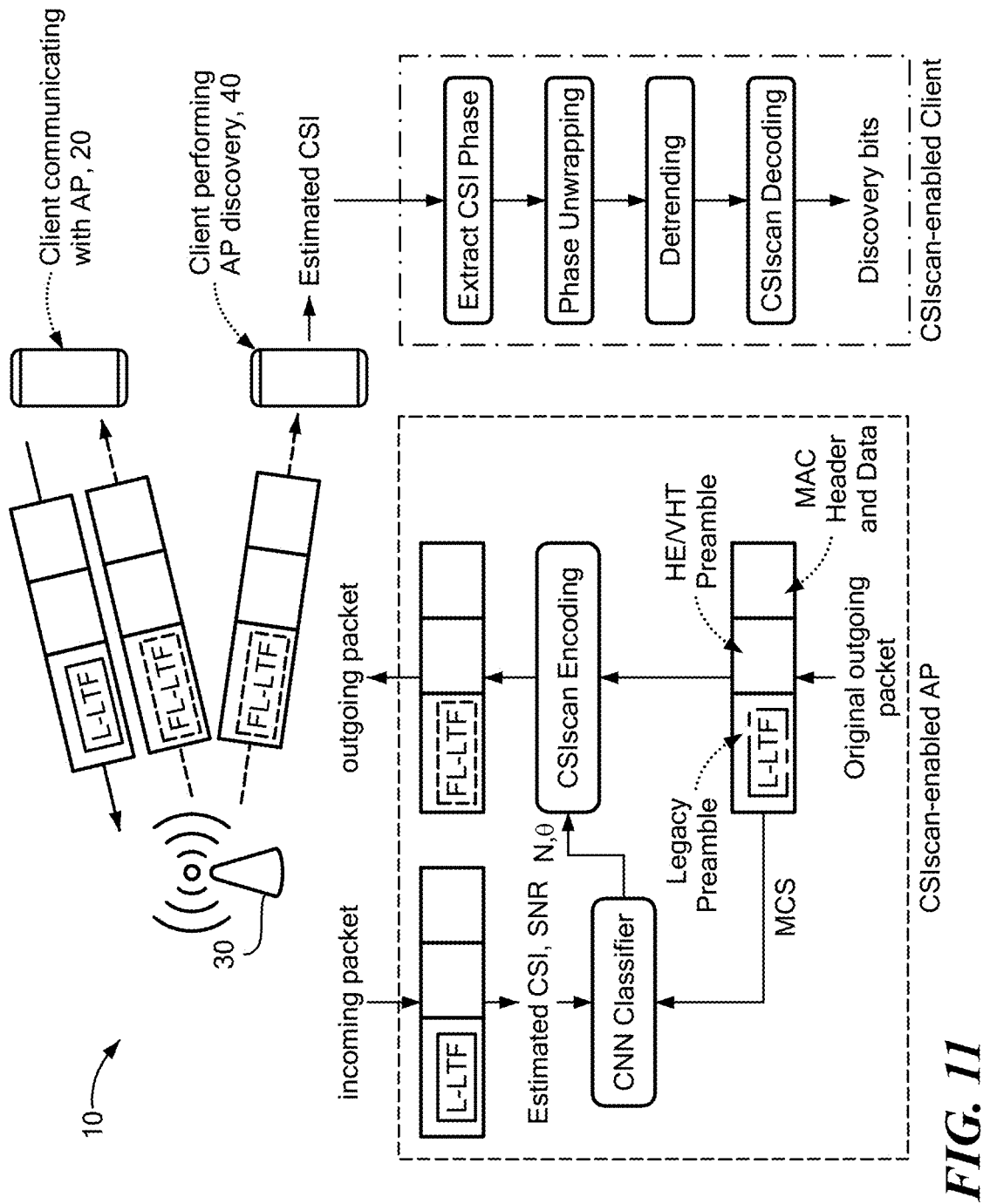
FIG. 11 is a schematic illustration of an embodiment of a method of operation of AP discovery employed in a Wi-Fi AP and Wi-Fi client.

FIG. 11 depicts operation of the discovery system. The system 10 leverages a previous transmission from a client 20 to infer at the AP 30 whether or not to embed and the rate of discovery information in the next outgoing transmission. In 802.11ax/ac standard, the AP regularly acquires the latest CSI of the client through sounding frames that are used for MIMO/beamforming operation. It can also estimate an effective SNR using received signal strength indicator (RSSI) measurements and the value of noise floor. The combined knowledge of CSI and SNR is sufficient to accurately determine the quality of the channel between the AP and the client. The system feeds CSI and SNR information obtained from previous transmission in conjunction with a data rate opted for next transmission (MCS index) to a trained deep learning classifier 32. The deep learning classifier infers the optimal bound on $N_{max}$ and $\theta_{max}$. The discovery system encoding module 34 later uses these bounds to embed discovery information in the outgoing packet. Specifically, the intelligent system maps discovery bits into coefficients of an FIR filter that perturbs the phase of L-LTF symbols of the outgoing packet. This modified packet is then sent to the client 20. Despite the intentional packet modifications, the intelligent system ensures that the PER at this client does not increase beyond 1%. On the other hand, new clients 40 that wish to discover AP can exploit these modification to extract discovery information embedded within estimated CSI. After post-processing i.e., phase unwrapping and removing slope of phase information of CSI, the client recovers the discovery bits by following decoding step.

With the technology, a data collection process can be provided for training of CNN classifier. Unlike traditional machine learning algorithms, the performance of the CNN grows with increasing data size. However, generating a massive amount of labeled data from a large number of real deployed Wi-Fi devices without violating their privacy constraint is a time-consuming process. Instead, a simulation environment is leveraged that closely matches with a real Wi-Fi environment to achieve the same task.

Figure 12:
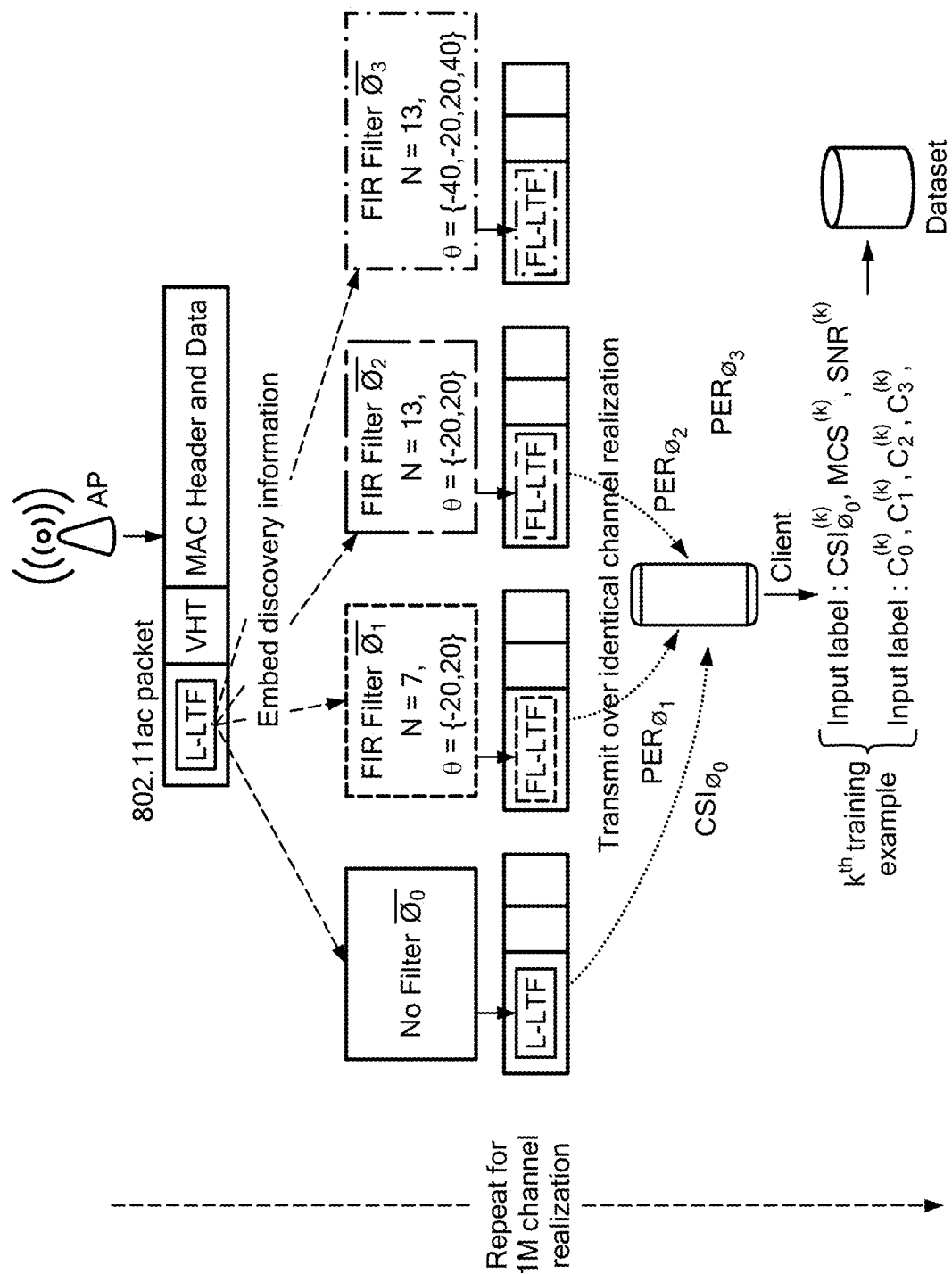
FIG. 12 is a schematic illustration of a data collection process for AP discovery.

FIG. 12 presents a data collection process. For each filter, consider a distinct bound of $N_{max}$ and $\theta_{max}$ as described in Table 1. Here, only three bounds are used to limit the size of dataset. Later, the AP sequentially transmits four packets (three filtered packets and a non-filtered packet) over a same instance of the simulated wireless channel. Except for the non-filtered packet, the AP embeds a distinct number of discovery bits in modified packets by choosing different bounds for FIR filter. The client receives these four packets at average SNR randomly selected between 0 to 35 dB. After packet detection, the client estimates CSI and then recovers bits of MAC layer packet from all packets individually. It compares the decoded bits in each packet with the transmitted bits to determine the packet error. The $CSI_{\varnothing_0}^k$ computed from non-filtered packet is recorded. This CSI simulates the explicit CSI obtained by the AP from the client through exchange of channel sounding packets. The PER $PER_{\varnothing_1}^k$, $PER_{\varnothing_2}^k$ and $PER_{\varnothing_3}^k$ from the three filtered packets is measured. Using these PER values and the rules defined in Table 2, four output class labels $C_0^k$, $C_1^k$, $C_2^k$, $C_3^k$ are generated. $CSI_{\varnothing_0}^k$, $MCS^k$ and $SNR^k$ are stored as input labels along with output class labels $C_0^k$, $C_1^k$, $C_2^k$, $C_3^k$ into dataset.

TABLE 1

Selected bounds of FIR filter for data collection process.

| Bounds for FIR filters | #Embedded discovery bits(R) |
|---|---|
| $\overline{\phi}_0$: No Filtering | 0 |
| $\overline{\phi}_1$: $N_{max}$, $\theta_{max}$ = 7, 20°, $\theta$ = {−20°, 20°} | 24 |
| $\overline{\phi}_2$: $N_{max}$, $\theta_{max}$ = 13, 20°, $\theta$ = {−20°, 20°} | 36 |
| $\overline{\phi}_3$: $N_{max}$, $\theta_{max}$ = 13, 40°, $\theta$ = {−40°, −20°, 20°, 40°} | 48 |

TABLE 2

Output Classes

| PER | Class |
|---|---|
| $PE\ R_{\tilde{\phi}_3} = 0$ | $C_3, \bar{\Phi}_3$ |
| $PE\ R_{\tilde{\phi}_3} \neq 0$ & $PE\ R_{\tilde{\phi}_2} = 0$ | $C_2, \bar{\Phi}_2$ |
| $PE\ R_{\tilde{\phi}_3} \neq 0$ & $PE\ R_{\tilde{\phi}_2} \neq 0$ & $PE\ R_{\tilde{\phi}_1} = 0$ | $C_1, \bar{\Phi}_1$ |
| $PE\ R_{\tilde{\phi}_3} \neq 0$ & $PE\ R_{\tilde{\phi}_2} \neq 0$ & $PE\ R_{\tilde{\phi}_1} \neq 0$ | $C_0, \bar{\Phi}_0$ |

Figure 13:
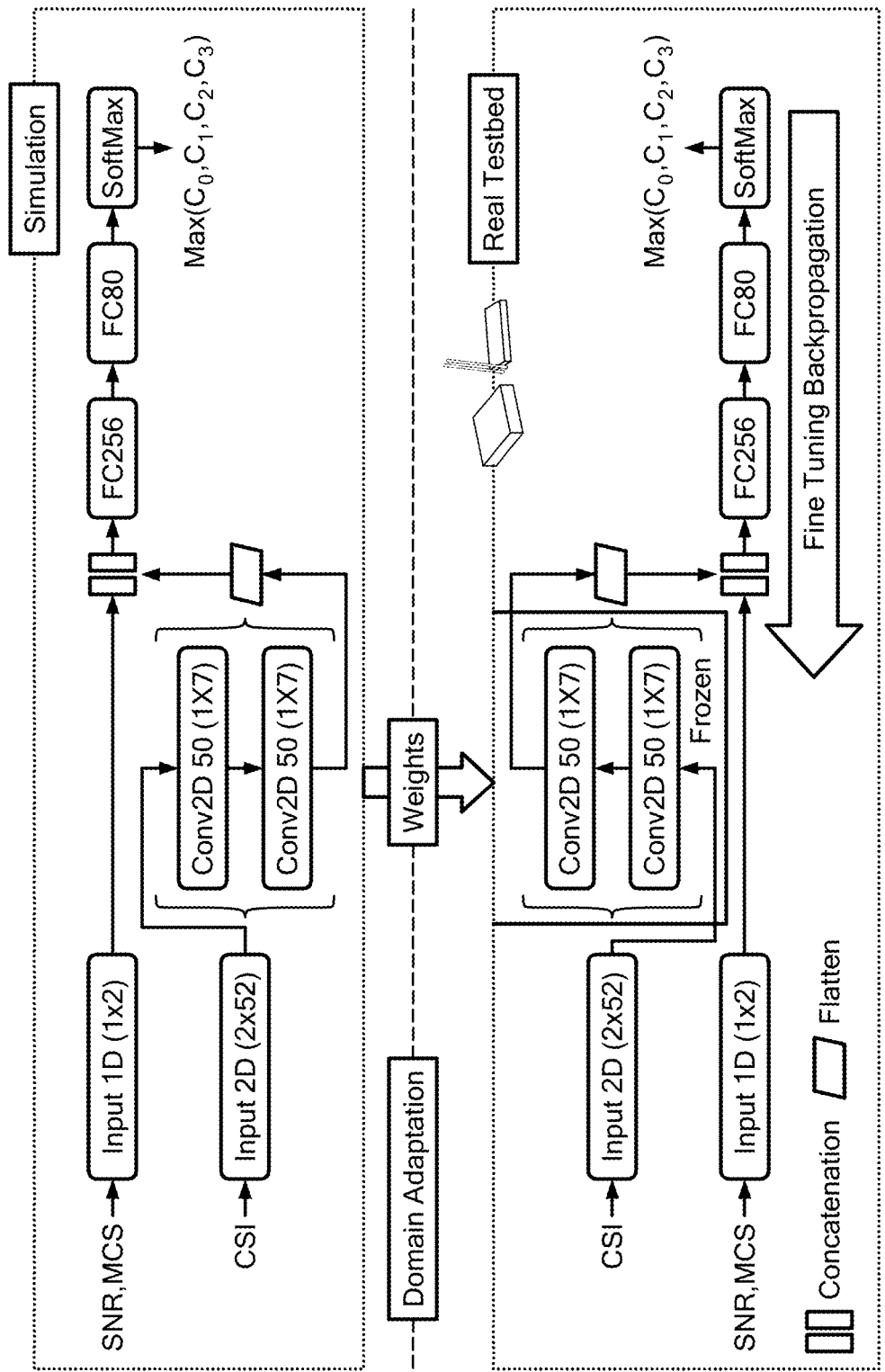
FIG. 13 is schematic representation of CNN architecture and supervised domain adaptation.

FIG. 13 illustrates a convolutional neural network (CNN) architecture to be used for learning CSI. It includes four layers, with two 2D convolution (Conv2D) layers and two fully connected (FC) layers. Inputs to the system are (a) main input that is a sequence of CSI with length 52 and (b) auxiliary input that is a tuple of SNR and MCS values. The CSI value for each subcarrier is a complex value and is represented as two-dimensional real values, i.e., I and Q are two real value streams, which results in the dimension of the input data growing to 2×52. This is then fed to the first convolution layer. The convolution layer includes a set of spatial filters, also called kernels, that perform a convolution operation over input data to extract the features. The first convolution layer includes 50 filters, each of size 1×7, in which each filter learns a 7-sample variation in time over the I or Q dimension separately, to generate 50 distinct feature maps over the complete input sample. Similarly, the second convolution layer has 50 filters each of size 2×7 and each filter learns variations, again of 7 activation values, over both I and Q dimensions of the 50-dimensional activation volume obtained after the first convolution layer. Each convolution layer is followed by a Rectified Linear Unit activation, that performs a pre-determined non-linear transformation on each element of the convolved output. The output of the second convolution layer is then concatenated with another auxiliary input including SNR and MCS information. The concatenated layer is then fed to the first fully connected layer, which has 256 neurons. A second fully connected layer of 80 neurons is added to extract higher level non-linear combinations of the features extracted from previous layers, which are finally passed to a classifier layer.

A softmax classifier is used in the last layer to output the probabilities of each sample being fed to the CNN. The choice of hyperparameters such as, filter size, number of filters in the convolution layers, and the depth of the CNN is of high importance to ensure that the CNN model generalizes well. These are chosen carefully through cross validation. In order to overcome overfitting, the dropout rate is set to 50% at the fully connected layers. Also an $l_2$ regularization parameter $\lambda=0.0001$ is used. The weights of the network are trained using Adam optimizer with a learning rate of $l_r=0.0001$. The prediction error is minimized through back-propagation, using categorical cross-entropy as a loss function computed on the classifier output. In one example, the CNN architecture can be implemented in Keras running on top of TensorFlow on a system with 2 NVIDIA Cuda enabled Tesla K80m GPU.

For a real network deployment, collecting data from operating devices is time-consuming and resource-hungry process. With limited data, the performance of the CNN degrades drastically and thus becomes ineffective for live deployment. This issue can be overcome through a machine learning approach of supervised domain adaptation. Although, wireless channel in simulated and real environment follow different distributions, the task of selecting optimum bounds remains same. Thus, the knowledge obtained in a simulated environment can be transferred to real network deployment. In this case, two convolution layers of the CNN can be frozen and other layers fine tuned by retraining with real data.

Thus, the technology provides spectrum-efficient and low-latency WiFi access point (AP) discovery devices, systems, and methods for WiFi clients. The AP discovery technology is able to overlay discovery information by inducing synthetic IQ variations into the legacy preambles of ongoing transmissions from APs without impacting its BER beyond the pre-set threshold. A new WiFi client can decode this transmission, without actively searching, for discovering the access point. The technology includes features such as (i) an encoding scheme to map discovery information into the coefficients of an FIR filter used by the AP, (ii) a decoding scheme to extract discovery information at a WiFi client using only channel state information at the physical layer, without any MAC layer processing (iii) a convolutional neural network (CNN) to determine the optimal configuration under varying channel conditions, and (iv) supervised domain adaptation for realistic deployment to quickly train CNN even with limited availability of data. The AP discovery technology can improve the spectrum efficiency of the network by reducing the overhead up, in some cases up to 72% due to discovery traffic, while the long-tail (99th percentile) Wi-Fi latency at the client can be reduced by 95%.

The AP discovery technology can avoid discovery solutions involve that involve configuring or fine-tuning scanning parameters that do not work well in all network deployments especially when end-users regularly change their WiFi networks. The system can avoid scanning in all channels and thus considerably reduce search time as well as the number of management packets that are exchanged.

The technology can provide features and aspects including overlay of access points (APs) discovery information in the form of synthetic variations into the legacy preambles of ongoing APs transmissions, which reduces the APs' overhead due to discovery and increase in speed of AP discovery at a client; an encoding scheme to map AP discovery information into the coefficients of a FIR filter used by the AP; the extraction of AP discovery information at the physical layer without any MAC layer processing; and an AI-powered algorithm to determine an optimal selection of AP bounds for i) phase shifts ii) number of subcarriers.

The technology can improve spectrum efficiency and utilization by reducing redundant exchange of AP management packets, in some cases up to 72% increase in AP spectrum efficiency. The technology can improve the speed of AP discovery at WiFi clients by reducing the number of the client's active triggers on every WiFi channels, in some cases a WiFi latency reduction from 150 ms to 10 ms. The technology can improve power consumption at WiFi clients by reducing the number packet exchanges for AP discovery that runs frequently.

The technology can enable faster and more energy efficient WiFi networks for consumers and businesses, including enabling enhanced WiFi services for use cases in, for example, education, retail, travel and hospitality, healthcare, banking, financial services, insurance and information technology (IT) segments. The technology can provide WiFi assisted IoT systems with longer network lifetime. The technology can enhance WiFi routers for internet service providers. The technology can be used in infrastructure WiFi access points at, for example, enterprise and city scale and in home WiFi networks. The technology can provide higher WiFi and internet speeds in dense environments and enable longer WiFi client device operation cycles, that can result in enhanced consumer satisfaction for WiFi service providers, with no or minimal additional hardware costs. The technology can provide an intelligent WiFi access point that utilizes spectrum in a more efficient manner. At a same or comparable cost of another product, an access point using this technology can provide higher throughput for the network. WiFi clients can experience reduced latency during discovery of access points. WiFi clients can conserve their energy in discovering and associating with WiFi access points by avoiding redundant transmissions of management packets.

EXAMPLE

A prototype was implemented to evaluate the AP discovery technology in a live Wi-Fi network of a university. The objective was to demonstrate the end-to-end functioning of the technology while assessing its performance on network, client and learning metrics.

Figure 20:
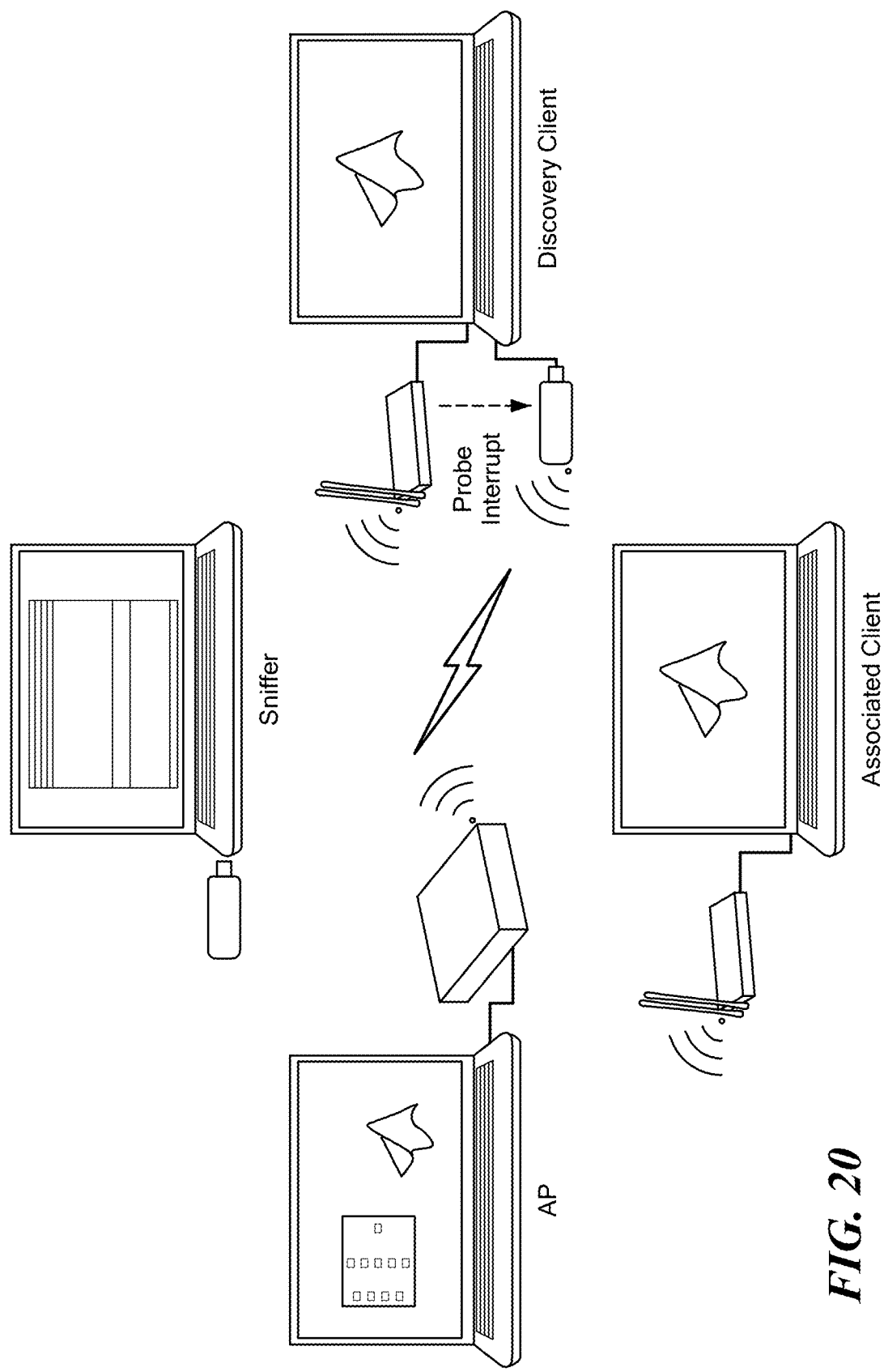
FIG. 20 illustrates an experimental setup.

FIG. 20 shows the experimental setup. An AP was configured with USRP X310 software defined radio (SDR). The AP transmitted 802.11ac compliant Wi-Fi packets on Ch #1. Each Wi-Fi packet contained beacon frames synthesized using Matlab WLAN System toolbox. Two USRP B210 SDRs acted as the discovery clients, one for each discovery protocol—default and the AP discovery system. They were tuned to the same channel as the AP. For the discovery system-based client, the challenge was to trigger active discovery, once it successfully decoded discovery bits embedded within CSI of the received packet. Triggering any type of scan with USRP is a challenging task. Therefore, the default wireless interface card of the laptop was relied on for execution of scanning. Default discovery client simply relied on onboard wireless card to trigger scan. When the packet reached the client over USRP, the programs interrupted the discovery code in the user space that triggered scan with Linux's iw utility. MAC frames were collected with a sniffer passively tuned to listen on the same channel. In addition, the transmission and reception were recorded at client's kernel.

The exact time instant about when to trigger the discovery procedure was decided by sophisticated algorithms at the client that reside in applications such as Network Managers and Kernel drivers. Regarding when to initiate the process, a conservative approach was taken by disabling all such network management applications. The client was instructed to trigger the discovery process, default or the AP discovery system, whenever a beacon was received by the AP. The approach had a couple of advantages (i) since beacons were transmitted in the order of few milliseconds, a client triggered its respective discovery quite aggressively, thereby allowing an understanding of the worst-case performance; and (ii) since the client initiated the discovery process at the same time, both of them got an equal opportunity to transmit the probe requests, thereby allowing to fairly compare both protocols.

The amount of spectrum wastage in the network was studied by measuring the number of probe responses generated. The latency observed by the client was analyzed. This was done for both default active and AP discovery system-based discovery. Once the client received a beacon packet over USRP, it sent probe request(s). With default discovery protocol, the client sent a probe request on all supported 39 Wi-Fi channels. With the AP discovery system, the client sent a targeted probe request on Ch #6 post successful decoding. If decoding failed, it followed default discovery. Here an assumption was made that the client had obtained discovery information across all channels and decided to discover AP on Ch #6, the reason being that i) the logic of choosing the strongest channel was already present in kernel drivers and network managers and ii) it was hard to scale USRP-based APs due to hardware limitations. The probe responses were recorded for 10 ms. for each probe request generated by the client. Using the ping utility, the client measured the latency experienced.

The classification as well as transfer learning accuracy of the CNN architecture was evaluated. This was required especially because the model was trained in a simulated environment, while it was actually used in the live environment. The performance of the CNN architecture was verified with data collected in simulations. The dataset included ~80K training and ~10K validation examples. Another ~10K examples were used to test the performance of trained model. For realistic channel conditions, over-the-air data was collected with USRP-based AP and client, deployed in the lab. Similar to data collection process in simulations, AP sequentially transmitted four packets (three filtered and a non-filtered packet). These packets were transmitted within coherence time and therefore, the channel was assumed to be constant. This scenario closely reflected the realistic Wi-Fi environment due to channel variations induced by people movement. The client after receiving the packet, first extracted CSI and then decoded the packet. The estimated CSI from non-filtered packet, along with MCS and estimated SNR was stored as input label, while the PER measured from decoded filtered packets were used to determine output labels. Here, the confusion matrices were plotted.

Bit stuffing efficiency was defined as the number of discovery bits successfully transmitted per packet. It was evaluated for various MCS rates with selection of i) a fixed bound or ii) adaptive bound, chosen by trained CNN model. The client extracted discovery bits by decoding estimated CSI from received packets. The number of successfully decoded discovery bits embedded in packets was measured. These packets were originally filtered at the AP with three bounds, i) $N_{max}=7$, $\theta_{max}=20$ ii) $N_{max}=13$, $\theta_{max}=20$, and iii) $N_{max}=13$, $\theta_{max}=40$. With the AP discovery technology, the AP dynamically selected the bounds based on the channel condition. For the sake of simplicity, the CNN model was used offline to find the dynamic bound on data collected at clients and compared the number of discovery bits embedded with fixed selected bounds.

Figure 14:
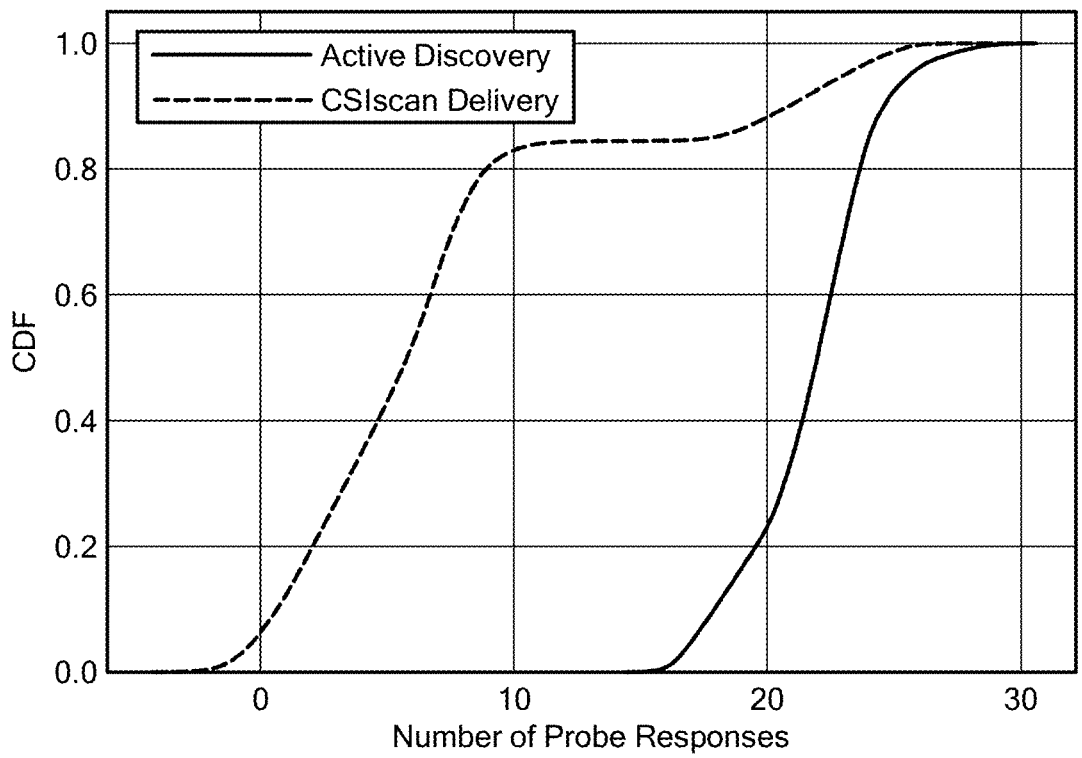
FIG. 14 is a graph of cumulative density function (CDF) of the number of probe responses received by the client for every probe request sent, showing a reduction in probe response of 72%.
Figure 15:
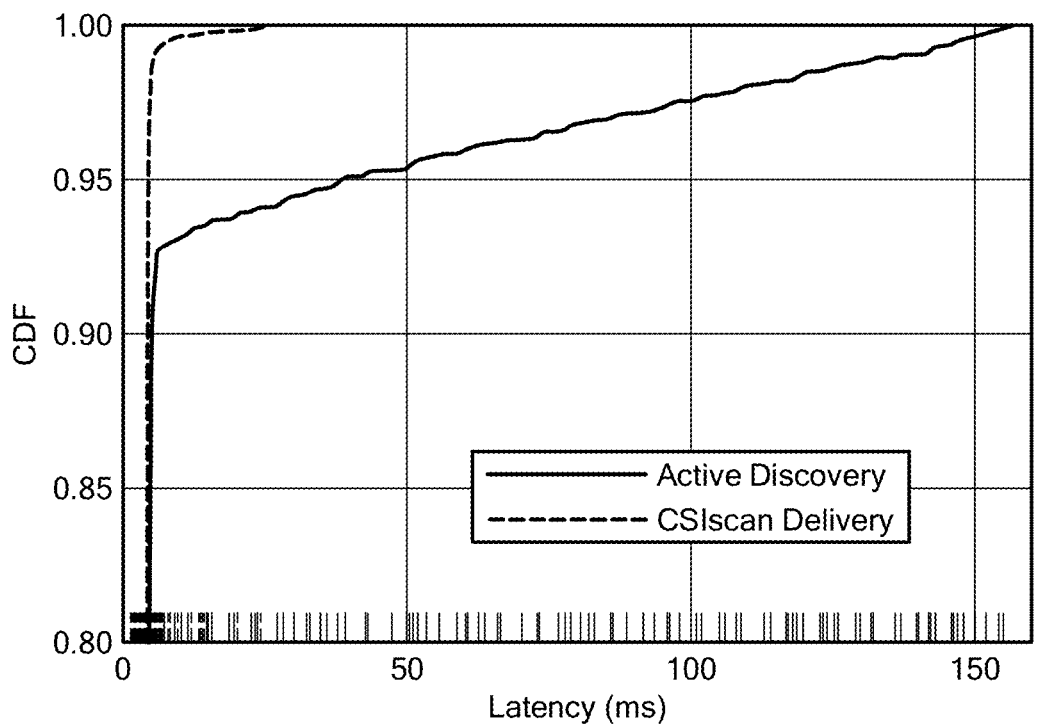
FIG. 15 is a graph the CDF of Wi-Fi latency experienced by the client, showing a reduction in tail latency from 150 ms to 10 ms.

FIG. 14 plots the CDF of the number of probe responses received by the client for every probe request sent either with default or the AP discovery system protocol. 22 (median) probe responses with default protocol were observed, whereas 6 were observed with the AP discovery system. Thus, the AP discovery system reduced the probe traffic by approximately 72%. Here, the probe responses that were transmitted after MaxCT at the client had expired and thus, not received by the client, were not considered. In addition, the number of probe responses that were lost due to collision were not considered. Thus, a higher percentage of the reduction in probe traffic with the AP discovery system was achieved than currently reported. FIG. 15 compares the Wi-Fi latency experienced by the client with default and the AP discovery system discovery protocol. While median Wi-Fi latency for default protocols was as low as ~4 ms, its 99th percentile is around 132 ms. This long tail distribution is not visible with the AP discovery system. The 99th percentile was around 6 ms. Thus, the AP discovery system alleviated the problem of long-tail latency caused by frequent discovery process.

Figure 16:
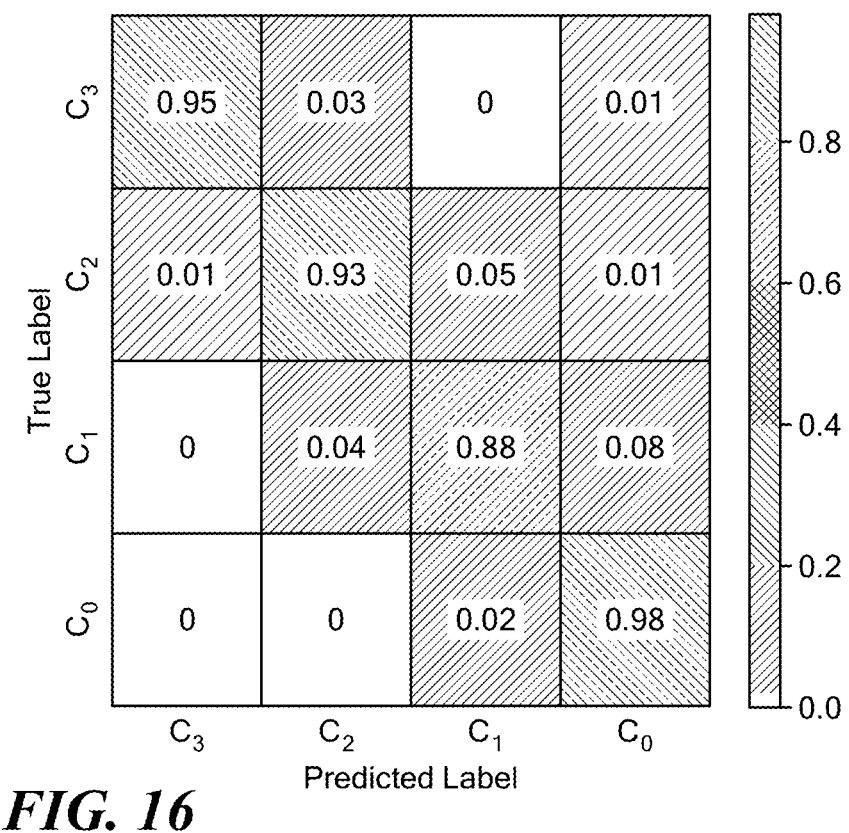
FIG. 16 shows a confusion matrix for a model trained with simulation, showing a CNN classifier achieved an overall accuracy of 95.20%.
Figure 17:
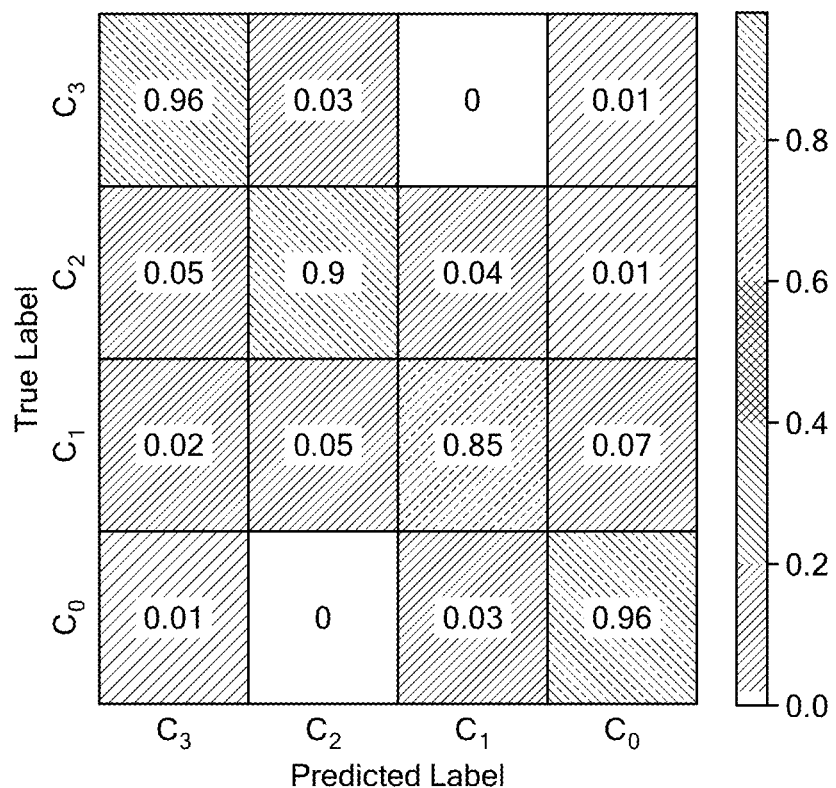
FIG. 17 shows a confusion matrix for the model trained with real data after transfer, showing an accuracy of 93.87% in a live environment.

FIG. 16 shows confusion matrix for the model trained with simulation data. An accuracy of 95.20% was achieved for correctly selecting one out of four bounds. For the testbed deployment, transfer learning was used to fine tune the CNN model with real data. FIG. 17 shows a confusion matrix for the model trained with real data after transfer learning. A classification accuracy of 93.87% was achieved. For retraining the CNN model, ~12K training examples were used, as compared to 80K, thus needing only 15% of the total training data used during simulation.

Figure 18:
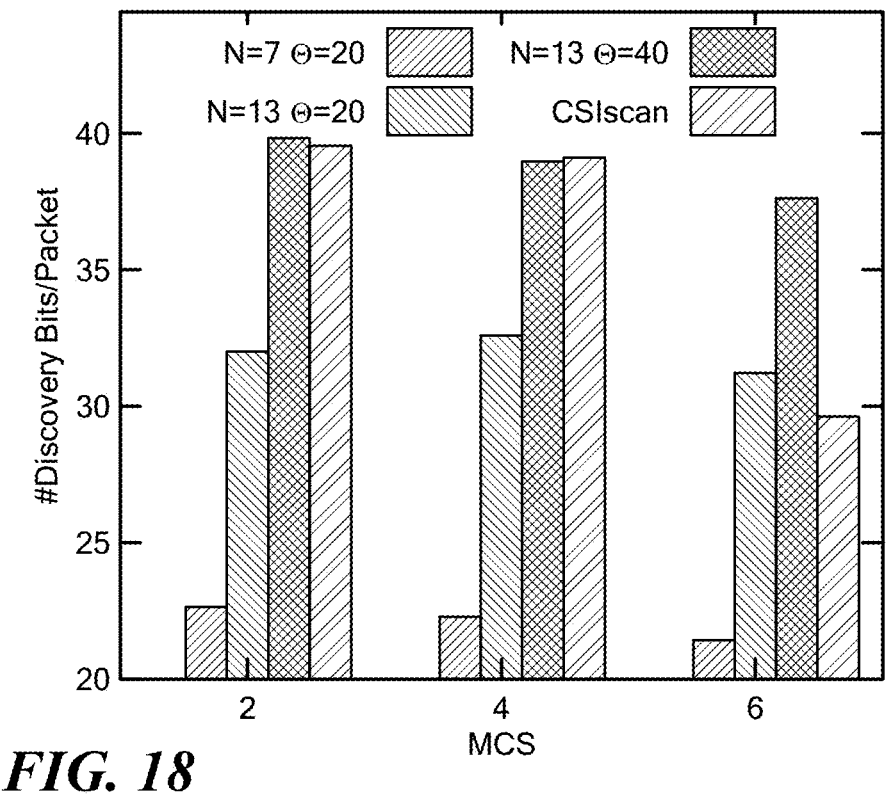
FIG. 18 is a graph of bit stuffing efficiency for various MCS with fixed bounds and with the adaptive bound.
Figure 19:
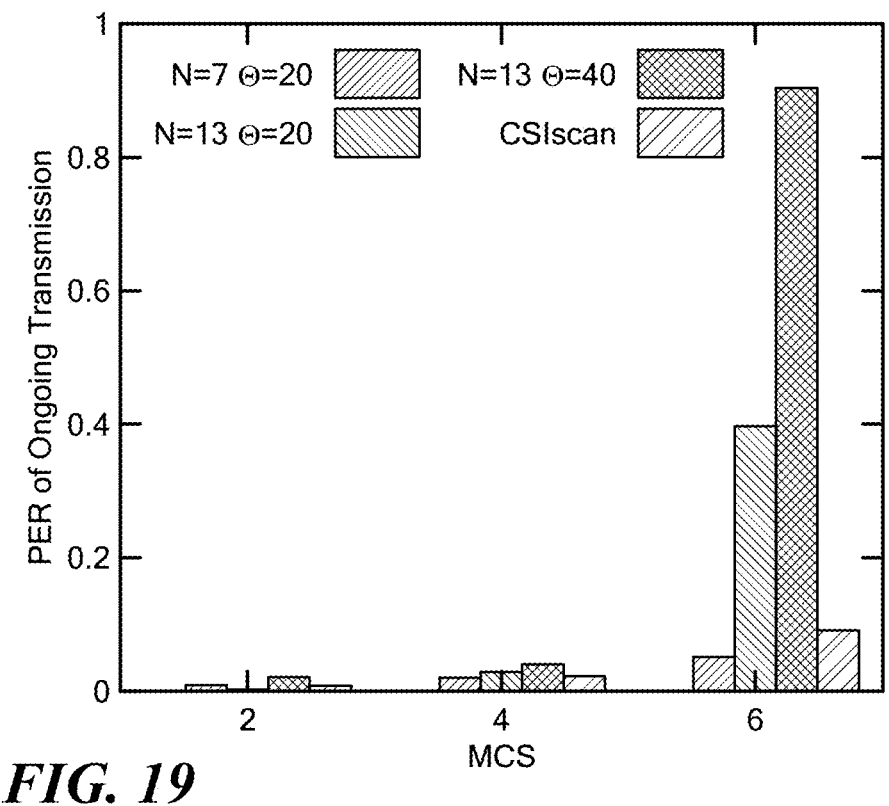
FIG. 19 is a graph of the packet error rate (PER) for various MCS with fixed bounds and with the adaptive bound. The AP discovery system is channel aware as it chooses an optimal combination of N and $\theta$.

FIG. 18 plots the bit stuffing efficiency for various MCS with fixed bounds and with the adaptive bound in the AP discovery system. The overly pessimistic approach of always choosing lower bound $N_{max}=7$ and $\theta_{max}=20$ in lesser bit stuffing efficiency of ~22 average discovery bits per packet. On the other hand, the selection of higher $N_{max}=13$ and $\theta_{max}=40$ severely impacted PER of the client at higher MCS rate, for example MCS=6, PER>85%. At MCS=6, even the moderate bound of $N_{max}=13$ and $\theta_{max}=20$ resulted in 40% PER. The AP discovery system with trained CNN model was able to dynamically adjust its bound that it embeds maximum discovery information while guaranteeing the PER at client is <1%. At higher MCS, the AP discovery system decided to avoid embedding information if the channel was not good enough, whereas if the channel condition permitted, it transmitted maximum information.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A method for discovering an access point in a wireless network, comprising:
    at an access point device, embedding discovery information into a transmission packet, the discovery information comprising modifications introduced into a preamble of the transmission packet for decoding by a client device, wherein the modifications are determined by passing in-phase quadrature (IQ) symbols through a finite impulse response (FIR) filter to introduce a phase shift in selected ones of the IQ symbols, the phase shifts encoded into bits in selected ones of a plurality of subcarriers of an orthogonal frequency division multiplexing scheme; and
    at the client device, receiving the outgoing packet and decoding the discovery information.

2. The method of claim 1, wherein the FIR filter comprises a set of coefficients, each coefficient representative of a phase shift in a respective one of the subcarriers of the transmission packet.

3. The method of claim 1, further comprising introducing the modifications into a long training field portion of the preamble of the outgoing packet.

4. The method of claim 1, further comprising setting a maximum phase shift bound for the phase shifts, and setting a maximum number of the selected ones of the subcarriers at which the IQ symbols are modified.

5. The method of claim 1, further comprising:
    dividing the plurality of subcarriers into a discovery rate field configured to convey a rate of discovery information and a discovery data field configured to convey discovery information; and
    dividing the discovery data field into a plurality of sequential groups of subcarriers, wherein for each group, a block of discovery information includes:
        bits representative of subcarrier locations within a selected group, and
        bits representative of the phase shifts encoded within the subcarrier locations within the selected group.

6. The method of claim 5, further comprising determining each block of discovery information from a subcarrier mapping table comprising a correspondence between a designation of input bits and determining a subcarrier index from a phase shift mapping table comprising a correspondence between an additional designation of input bits and a phase shift angle; and
    at the client device, demapping estimated phase shifts using a same phase shift mapping table and demapping indexes of the subcarriers to recover the discovery information bits using a same subcarrier mapping table.

7. The method of claim 1, further comprising acquiring channel state information and signal to noise ratio (SNR) information for a channel between the access point device and the client device from one or more previous transmissions, and inputting the channel state information, the SNR, and a desired data rate into a classifier trained to provide an optimal bound on a maximum phase shift and a maximum number of subcarriers.

8. The method of claim 1, further comprising training the classifier with a convolutional neural network to learn the channel state information and determine an optimal maximum phase shift and an optimal maximum number of subcarriers at which the IQ symbols are modified for a given data rate and/or a given Modulation and Coding Scheme index value, wherein the classifier is trained initially using training data obtained in a simulated environment and subsequently retrained using transfer learning from the simulated environment to a deployed environment with training data obtained in the deployed environment.

9. The method of claim 1, further comprising at the client device:
    decoding the phase shifts and subcarrier indexes by detecting changes in estimated channel state information (CSI) by determining locations and heights of CSI phase patterns; and
    estimating phase shift information in sequential groups of subcarriers by comparison to threshold angles, wherein a presence of a phase shift indicates an index of a subcarrier within a group where an IQ symbol has been modified using the FIR filter by the access point device.

10. The method of claim 1, further comprising at the client device, sending a discovery request targeted to the access point device that transmitted the transmission packet with the modifications.

11. The method of claim 1, further comprising at the client device, receiving a plurality of additional transmission packets from a plurality of additional access point devices, decoding phase shifts and subcarrier indexes from each of the additional transmission packets, and sending a discovery request to a selected one of the access point device and the additional access point devices.

12. A device for access point discovery in a wireless network, comprising:
- a module including one or more processors and memory, the module operative to embed discovery information into a transmission packet, the discovery information comprising modifications introduced into a preamble of the transmission packet for decoding by a client device, wherein the modifications are determined by passing in-phase quadrature (IQ) symbols through a finite impulse response (FIR) filter to introduce a phase shift in selected ones of the IQ symbols, the phase shifts encoded into bits in selected ones of a plurality of subcarriers of an orthogonal frequency division multiplexing scheme; and
- a radio frequency (RF) front end and antenna operative to transmit the transmission packet for discovery by the client device.

13. The device of claim 12, wherein the FIR filter comprises a set of coefficients, each coefficient representative of a phase shift in a respective one of the sub carriers of the transmission packet.

14. The device of claim 12, wherein the modifications are introduced into a long training field portion of the preamble of the outgoing packet.

15. The device of claim 12, wherein the phase shifts are bounded by a maximum phase shift, and a number of the selected ones of the subcarriers is bounded by a maximum number of subcarriers at which the IQ symbols are modified.

16. The device of claim 12, wherein:
- the plurality of subcarriers is divided into a discovery rate field configured to convey a rate of discovery information and a discovery data field configured to convey discovery information;
- the discovery data field is subdivided into a plurality of sequential groups of subcarriers, and for each group, a block of discovery information includes:
  - bits representative of subcarrier locations within a selected group, and
  - bits representative of the phase shifts encoded within the subcarrier locations within the selected group; and
- each block of discovery information is determined from a subcarrier mapping table comprising a correspondence between a designation of input bits and a subcarrier index, and from a phase shift mapping table comprising a correspondence between an additional designation of input bits and a phase shift angle.

17. The device of claim 12, wherein the module is operative to:
- acquire channel state information and signal to noise ratio (SNR) information for a channel between the access point device and the client device from one or more previous transmissions, and
- input the channel state information, the SNR, and a desired data rate into a classifier comprising a trained convolutional neural network to determine an optimal maximum phase shift and an optimal maximum number of subcarriers at which the IQ symbols are modified for a given data rate and/or a given Modulation and Coding Scheme index value, wherein the convolutional neural network is trained initially using training data obtained in a simulated environment and is retrained subsequently with limited training data obtained in a deployed environment aided with transferred knowledge from the simulated environment to the deployed environment using transfer learning.

18. A system for access point discovery in a wireless network comprising:
- the access point device of claim 12; and
- a client device operative to receive the transmission packet from the access point device and decode phase shifts and subcarrier indexes.

19. The system of claim 18, wherein the client device is operative to:
- decode the phase shifts and subcarrier indexes by detecting changes in estimated channel state information (CSI) by determining locations and heights of CSI phase patterns; and
- estimate phase shift information in sequential groups of subcarriers by comparison to threshold angles, wherein a presence of a phase shift indicates an index of a subcarrier within a group where an IQ symbol has been modified using the FIR filter by the access point device.

20. The system of claim 18, wherein the client device is operative to send a discovery request targeted to the access point device that transmitted the transmission packet with the modifications.

* * * * *